(12) United States Patent
Grieco

(10) Patent No.: US 12,597,971 B2
(45) Date of Patent: *Apr. 7, 2026

(54) SYSTEM AND METHOD FOR ENHANCED MULTI-BEAM OPERATION

(71) Applicant: TOYOTA JIDOSHA KABUSHIKI KAISHA, Toyota (JP)

(72) Inventor: Donald M. Grieco, Manhasset, NY (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

This patent is subject to a terminal disclaimer.

(21) Appl. No.: 18/403,478

(22) Filed: Jan. 3, 2024

(65) Prior Publication Data

US 2024/0137084 A1 Apr. 25, 2024

Related U.S. Application Data

(63) Continuation of application No. 17/448,656, filed on Sep. 23, 2021, now Pat. No. 12,095,530.

(Continued)

(51) Int. Cl.
*H04B 7/0456* (2017.01)
*H04B 7/06* (2006.01)
(Continued)

(52) U.S. Cl.
CPC ......... *H04B 7/0486* (2013.01); *H04B 7/0695* (2013.01); *H04B 17/382* (2015.01);
(Continued)

(58) Field of Classification Search
CPC .. H04B 7/0486; H04B 7/0695; H04B 17/382; H04B 7/088; H04W 72/046;
(Continued)

(56) References Cited

U.S. PATENT DOCUMENTS 12,095,530 B2 * 9/2024 Grieco .................. H04W 72/21
2018/0288753 A1 * 10/2018 Kishiyama .......... H04W 56/001
(Continued)

OTHER PUBLICATIONS

ETSI TS 138 214, "Technical Specification: Physical layer procedures for data", 3GPP TS 38.214 version 15.3.0, Release 15, Oct. 2018, 99 pages.
(Continued)

*Primary Examiner* — Kenneth T Lam
(74) *Attorney, Agent, or Firm* — Finnegan, Henderson, Farabow, Garrett, and Dunner, LLP

(57) ABSTRACT

A system, method and apparatus for mobile communications including sidelink transmissions is provided. A user equipment (UE) receives one or more messages comprising configuration parameters of reference signals associated with a plurality of uplink beams and a first downlink beam. The UE identifies a plurality of uplink beams associated with the first downlink beam based on a measurement of the reference signals and a corresponding ranking associated with each of the plurality of uplink beams. The UE determines a first plurality of uplink beams that satisfy maximum permissible exposure (MPE) limits and that are not subject to link failure. The UE then transmits uplink data or control information using the first uplink beam with the highest ranking.

34 Claims, 21 Drawing Sheets

Related U.S. Application Data

(60) Provisional application No. 63/083,212, filed on Sep. 25, 2020.

(51) Int. Cl.

| | |
|---|---|
| *H04B 17/382* | (2015.01) |
| *H04W 72/044* | (2023.01) |
| *H04W 72/21* | (2023.01) |
| *H04W 72/563* | (2023.01) |

(52) U.S. Cl.
CPC ......... *H04W 72/046* (2013.01); *H04W 72/21* (2023.01); *H04W 72/563* (2023.01)

(58) Field of Classification Search
CPC . H04W 72/21; H04W 72/563; H04W 52/367; H04L 5/0051
See application file for complete search history.

(56) References Cited

U.S. PATENT DOCUMENTS

| | | | |
|---|---|---|---|
| 2019/0141692 A1 | 5/2019 | Subramanian et al. | |
| 2020/0112926 A1* | 4/2020 | Laghate .............. | H04B 7/0695 |
| 2020/0314709 A1* | 10/2020 | Ly ................... | H04W 36/00725 |
| 2021/0159990 A1 | 5/2021 | Meylan et al. | |
| 2021/0297959 A1 | 9/2021 | Zhou et al. | |
| 2021/0320711 A1 | 10/2021 | Lee et al. | |
| 2021/0391913 A1 | 12/2021 | Zhou et al. | |
| 2021/0399783 A1 | 12/2021 | Onggosanusi et al. | |
| 2022/0007299 A1 | 1/2022 | Rahman et al. | |
| 2022/0014344 A1 | 1/2022 | Zhang et al. | |
| 2022/0045734 A1* | 2/2022 | Liu ........................ | H04W 16/28 |
| 2022/0070899 A1 | 3/2022 | Huang | |
| 2022/0123898 A1* | 4/2022 | Shi ........................ | H04W 72/20 |
| 2022/0294508 A1* | 9/2022 | Chen ................... | H04B 17/318 |
| 2023/0188197 A1 | 6/2023 | Zhang et al. | |
| 2024/0022940 A1* | 1/2024 | Yuan ................... | H04W 52/367 |
| 2024/0023033 A1* | 1/2024 | Caporal Del Barrio ..................... H04W 52/146 |

OTHER PUBLICATIONS

Non Final Office Action issued in U.S. Appl. No. 17/448,656, dated Jul. 21, 2022.

Final Office Action issued in U.S. Appl. No. 17/448,656, dated Feb. 15, 2023.

Non Final Office Action issued in U.S. Appl. No. 17/448,656, dated Jul. 24, 2023.

Non Final Office Action issued in U.S. Appl. No. 17/448,656, dated Feb. 27, 2024.

Notice of Allowance issued in U.S. Appl. No. 17/448,656, dated Jun. 12, 2024.

\* cited by examiner

| Transport channel Logical channel | BCH | PCH | DL-SCH |
|---|---|---|---|
| BCCH | X | | X |
| PCCH | | X | |
| CCCH | | | X |
| DCCH | | | X |
| DTCH | | | X |

FIG. 3A

| Transport channel Logical channel | UL-SCH | RACH |
|---|---|---|
| CCCH | X | |
| DCCH | X | |
| DTCH | X | |

FIG. 3B

| Transport channel Logical channel | SL-BCH | SL-SCH |
|---|---|---|
| SBCCH | X | |
| SCCH | | X |
| STCH | | X |

FIG. 3C

| Physical channel<br>Transport channel | PDSCH | PDCCH | PBCH |
|---|---|---|---|
| BCH | | | X |
| PCH | X | | |
| DL-SCH | X | | |

FIG. 4A

| Physical channel<br>Transport channel | PUSCH | PUCCH | PRACH |
|---|---|---|---|
| UL-SCH | X | | |
| RACH | | | X |

FIG. 4B

| Physical channel<br>Transport channel | PSSCH | PSCCH | PSFCH | PSBCH |
|---|---|---|---|---|
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

Procedure 1 (P1)

Procedure 2 (P2)

Procedure 3 (P3)

SYSTEM AND METHOD FOR ENHANCED MULTI-BEAM OPERATION

This application is a continuation of U.S. patent application Ser. No. 17/448,656, filed Sep. 23, 2021, which claims the benefit of U.S. Provisional Application No. 63/083,212, entitled SYSTEM AND METHOD FOR ENHANCED MULTI-BEAM OPERATION, and filed on Sep. 25, 2020. U.S. Provisional Application No. 63/083,212 and U.S. patent application Ser. No. 17/448,656 are incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
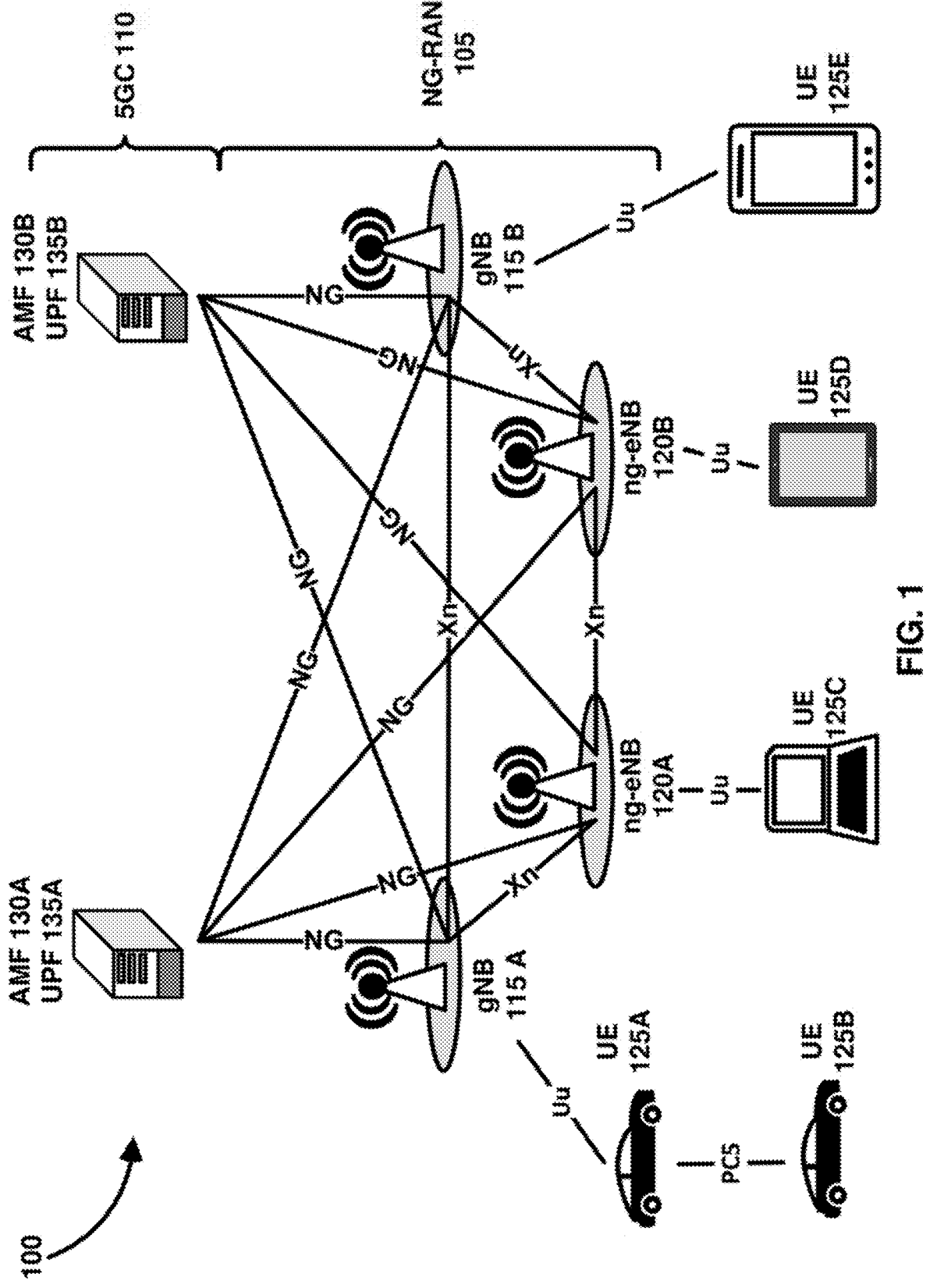
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, HOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN as described herein. Such other devices may have other functionality or multiple functionalities in addition to wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multihomed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
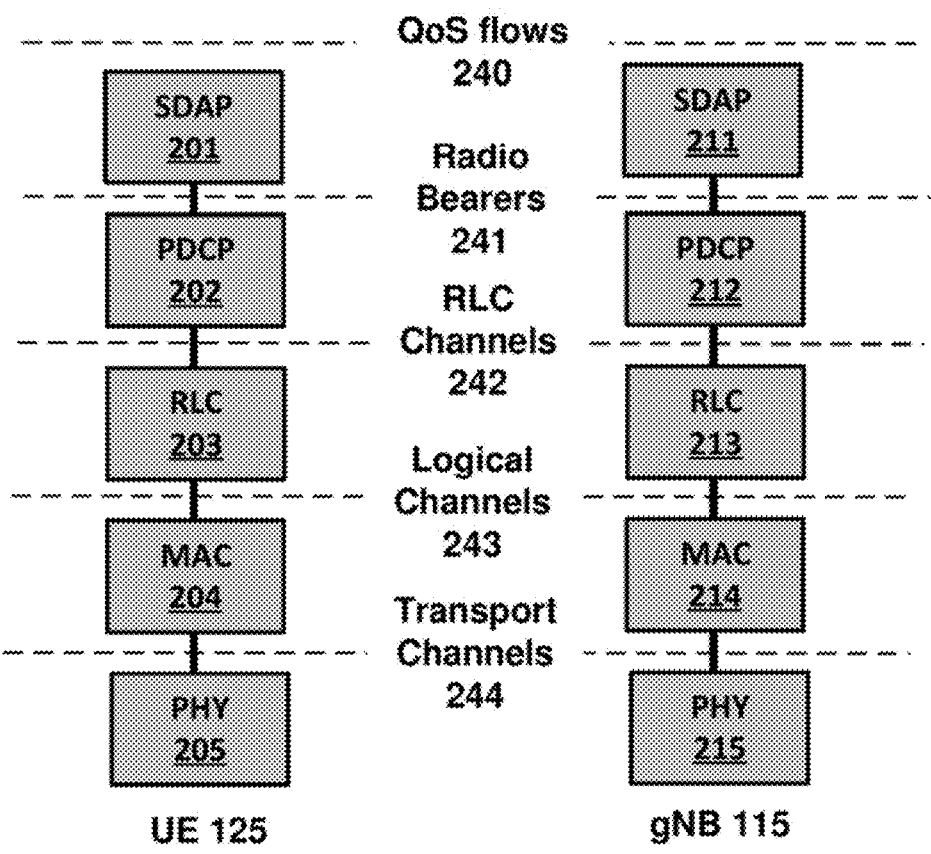
FIG. 2A and FIG. 2B show examples of radio protocol stacks for user plane and control plane, respectively, according to some aspects of some of various exemplary embodiments of the present disclosure.
Figure 2B:
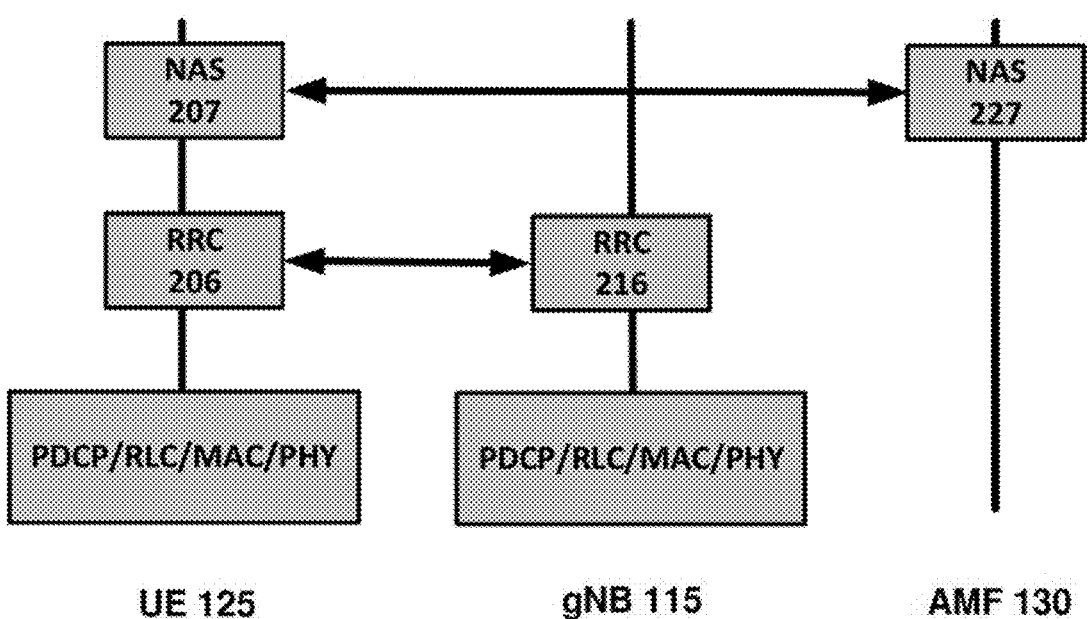

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figures 5A, 5B, 5C, 5D:
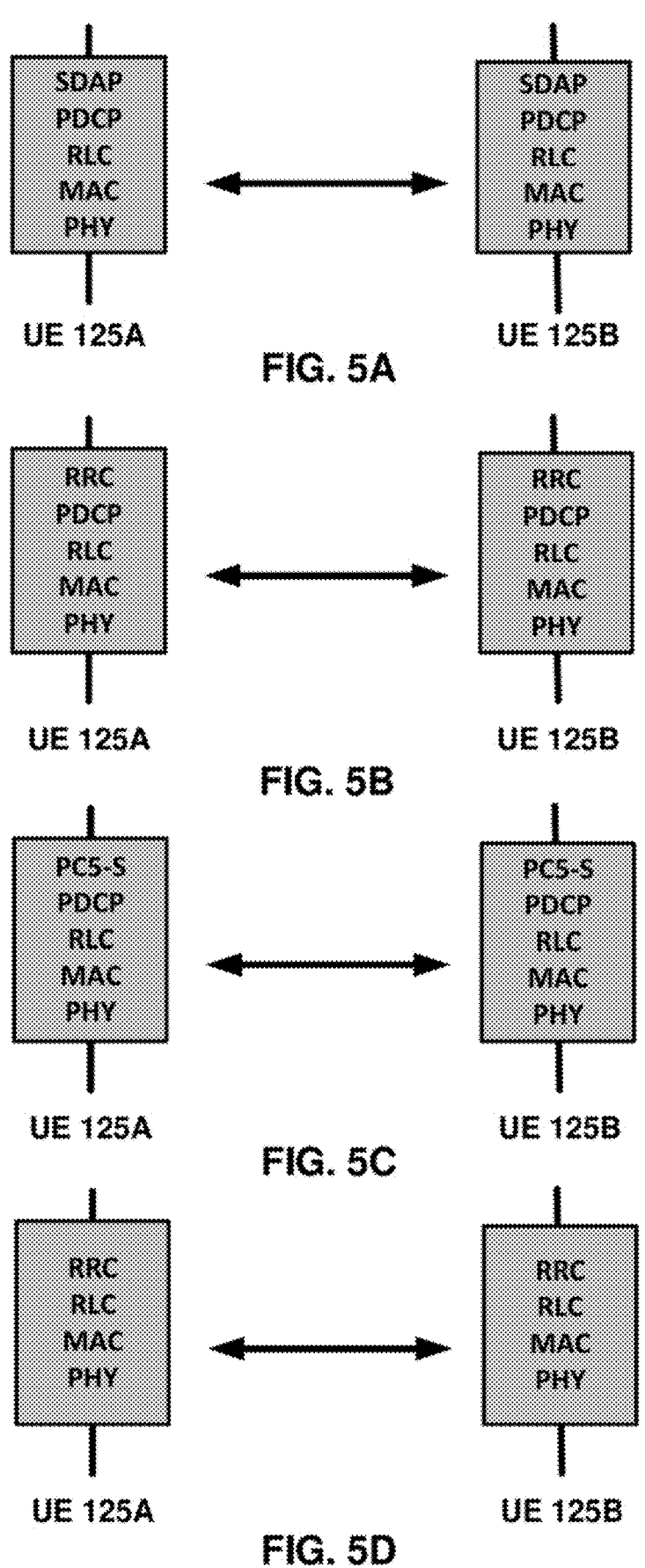
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bidirectional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
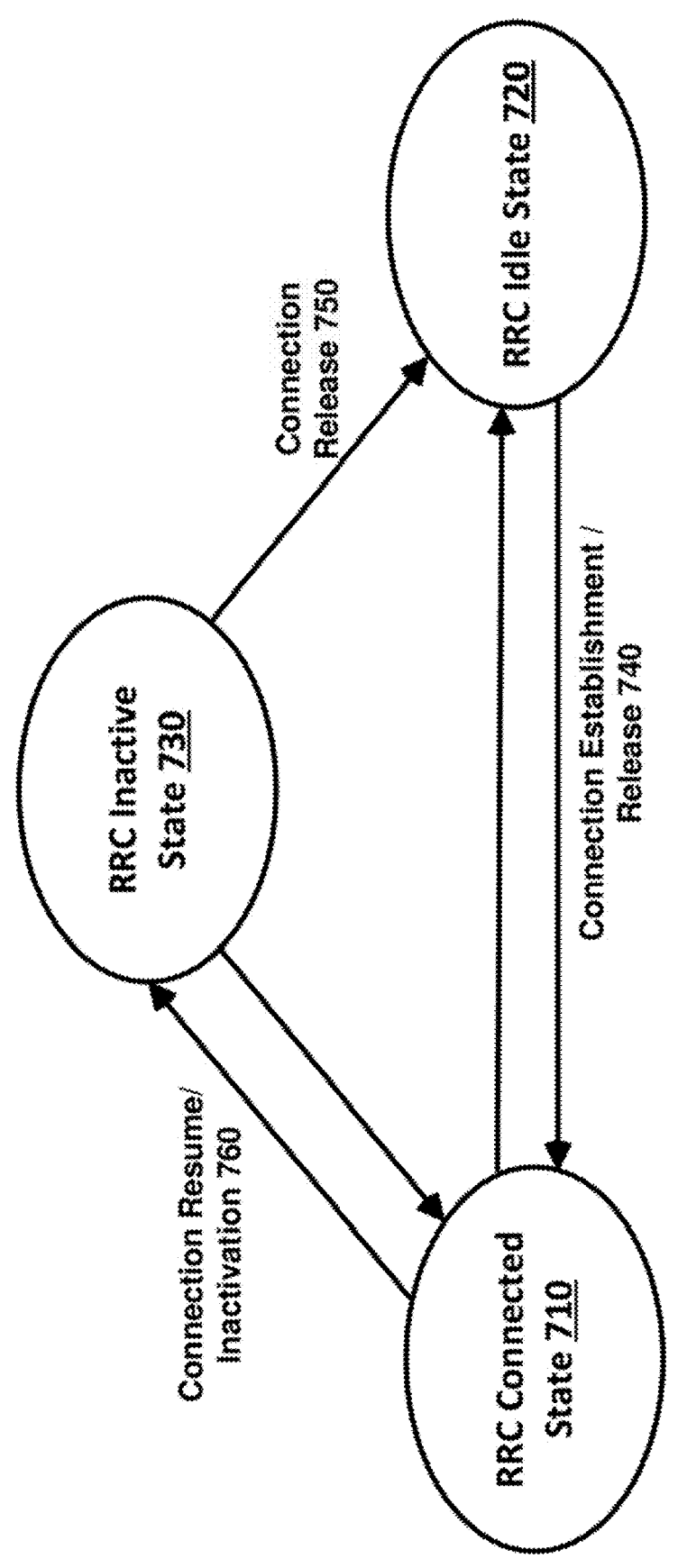
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
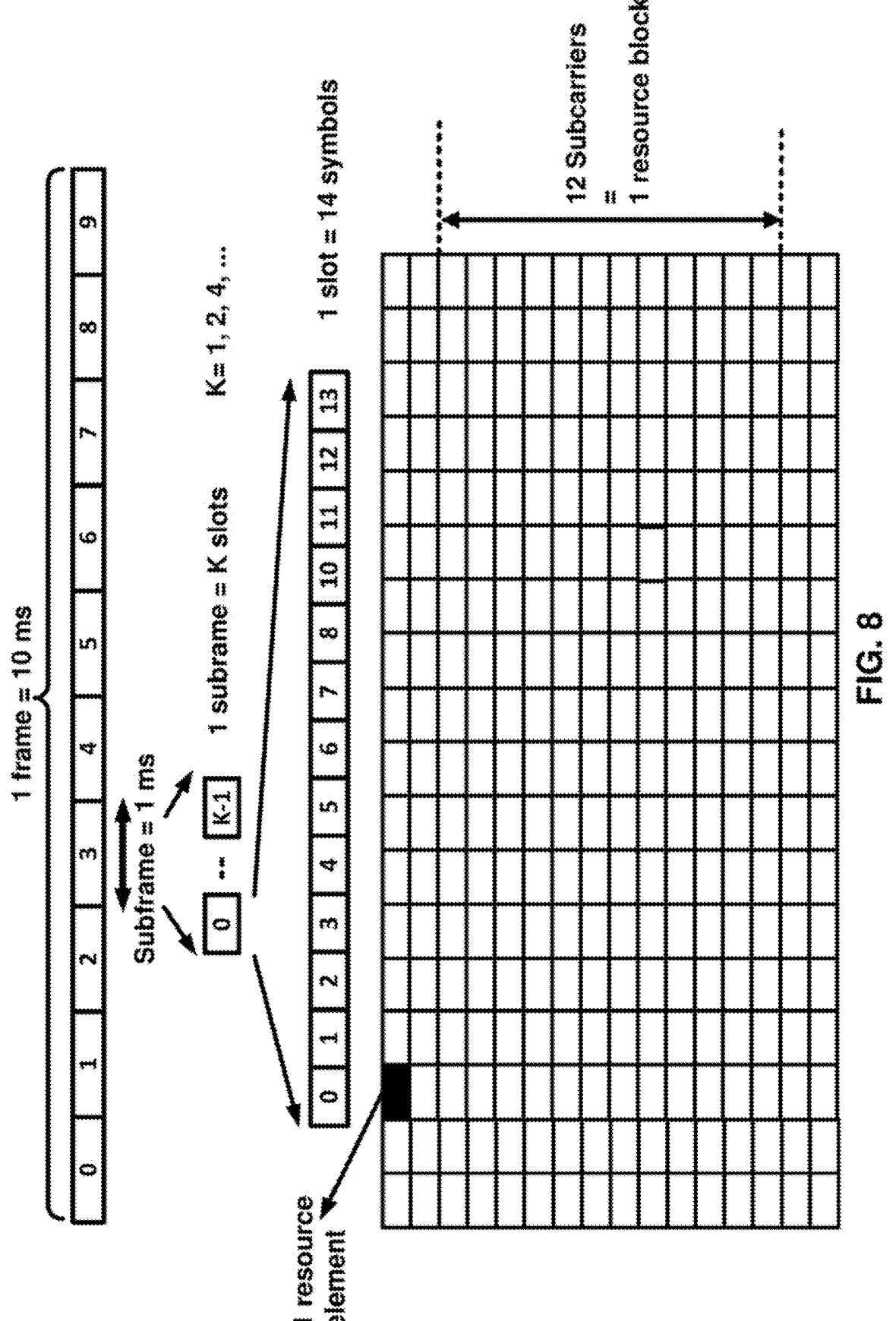
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
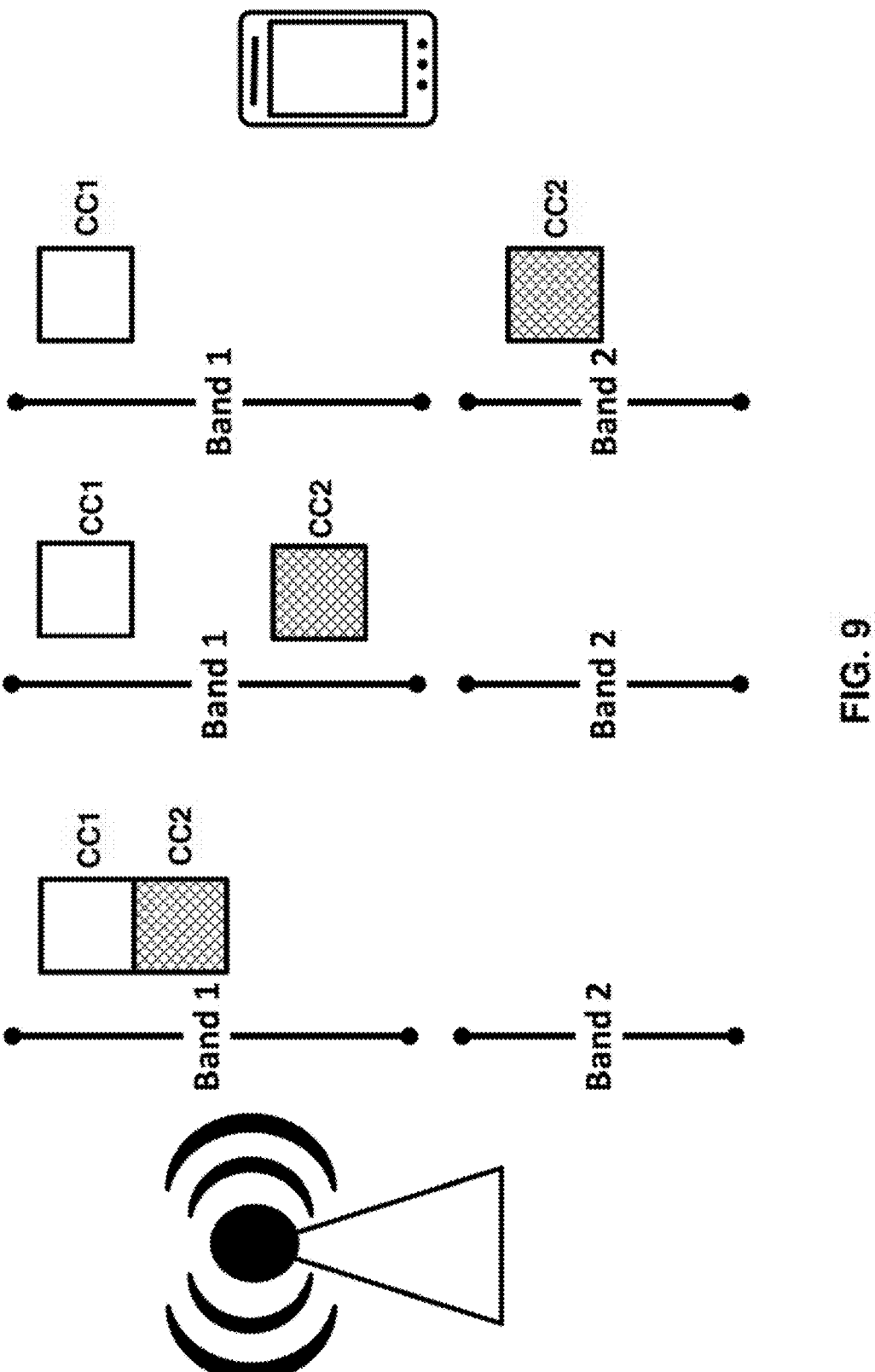
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
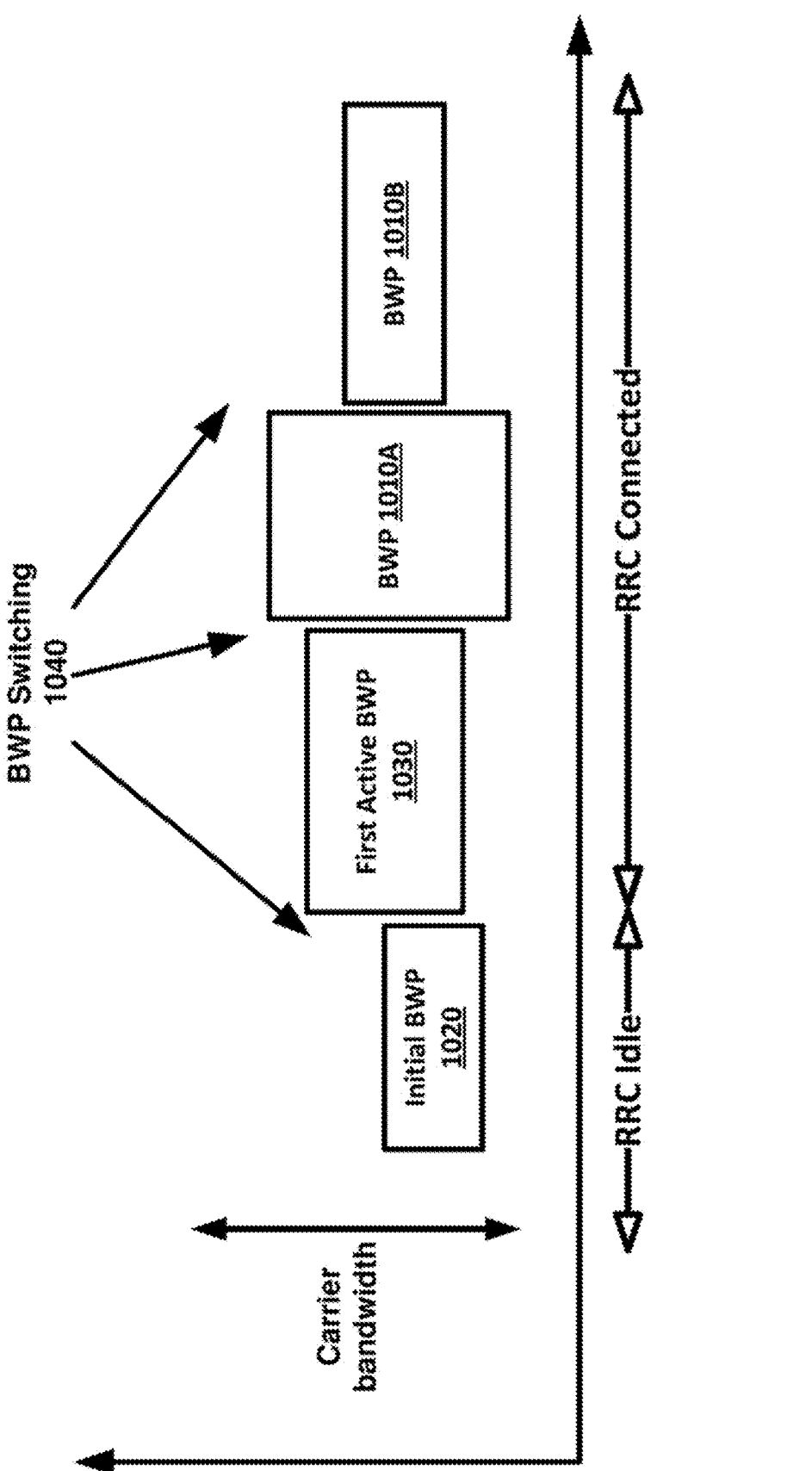
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
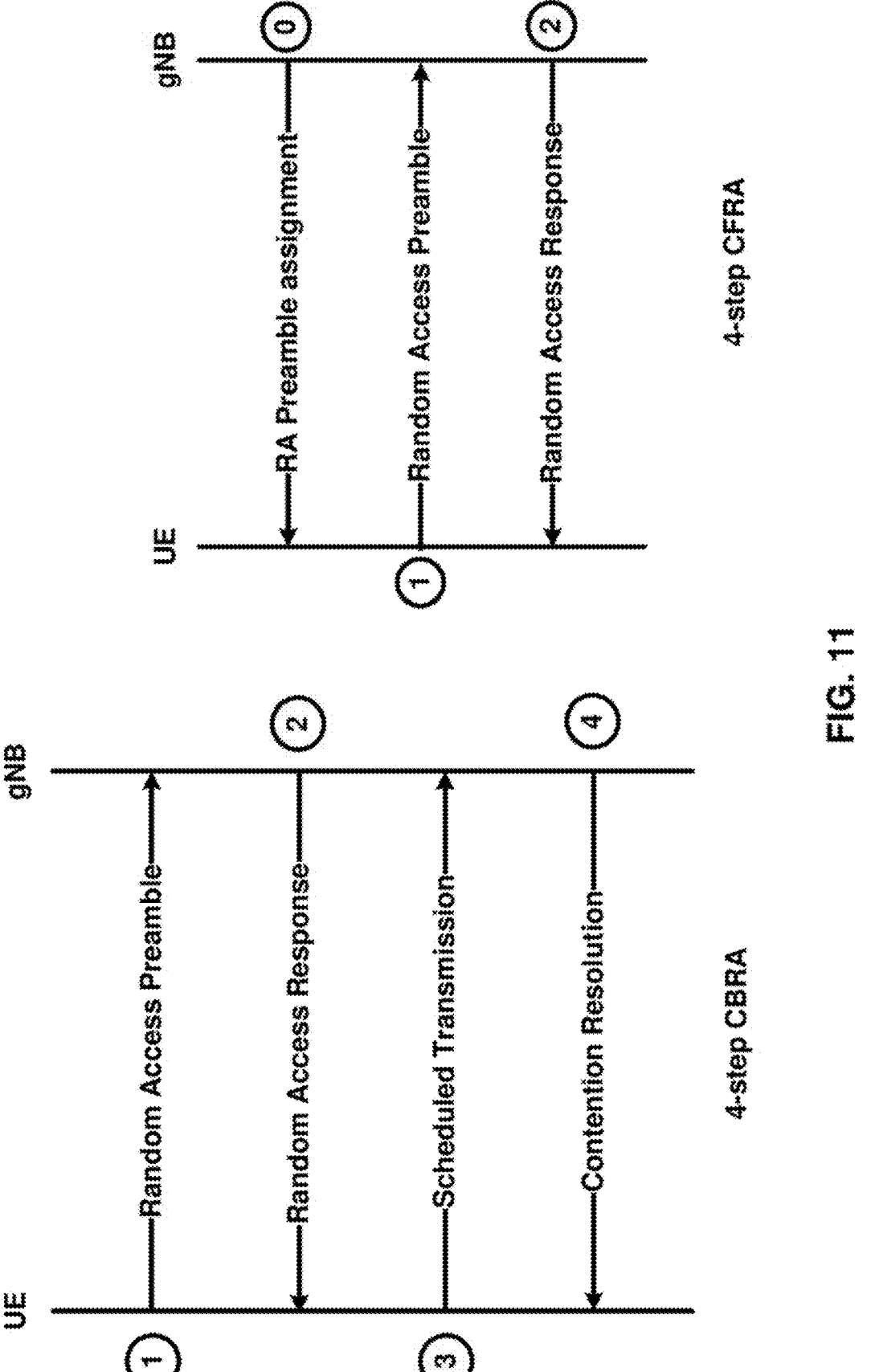
FIG. 11 shows example four-step contention-based and contention-free random access processes according to some aspects of some of various exemplary embodiments of the present disclosure.
Figure 12:
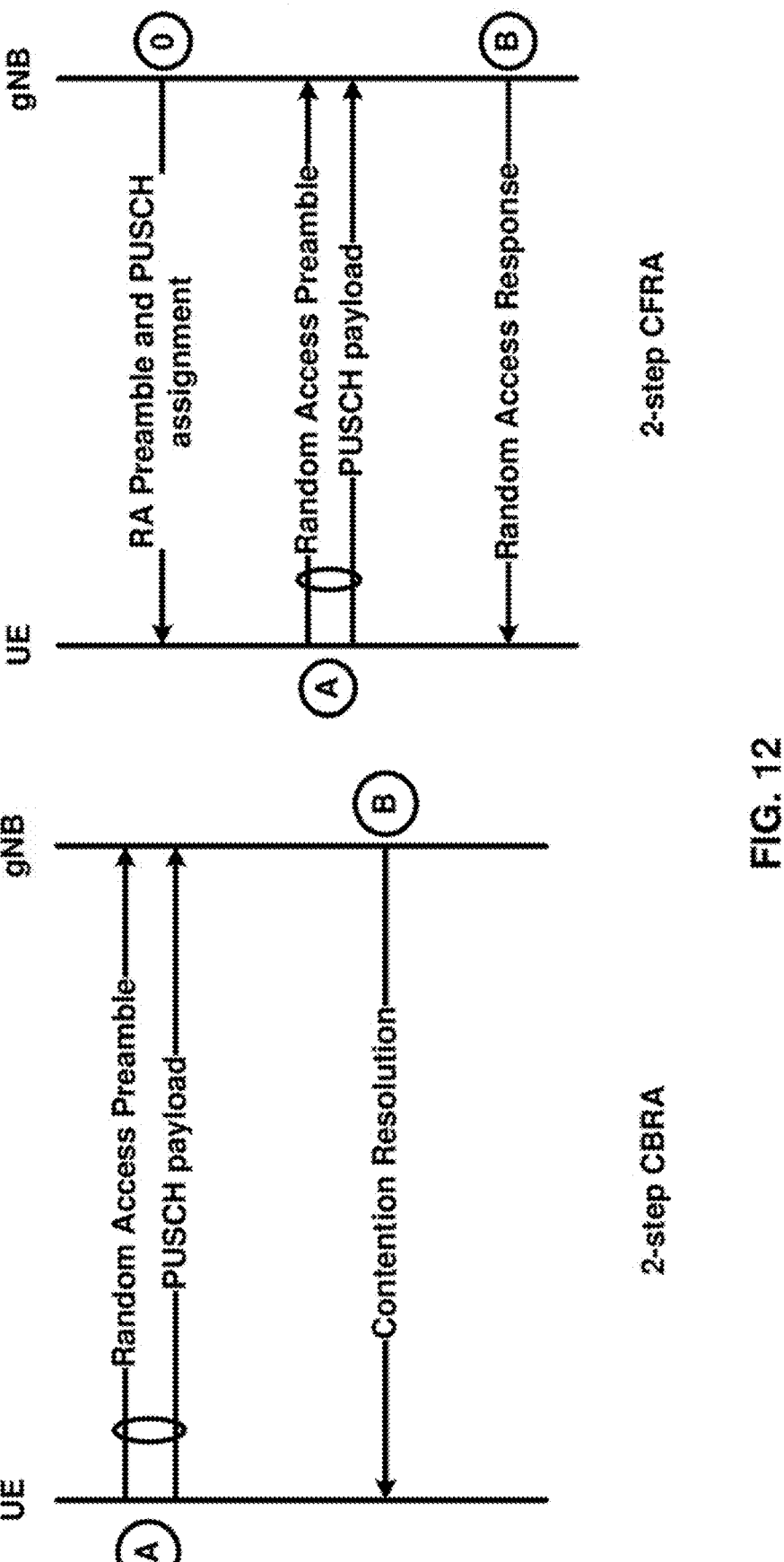
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
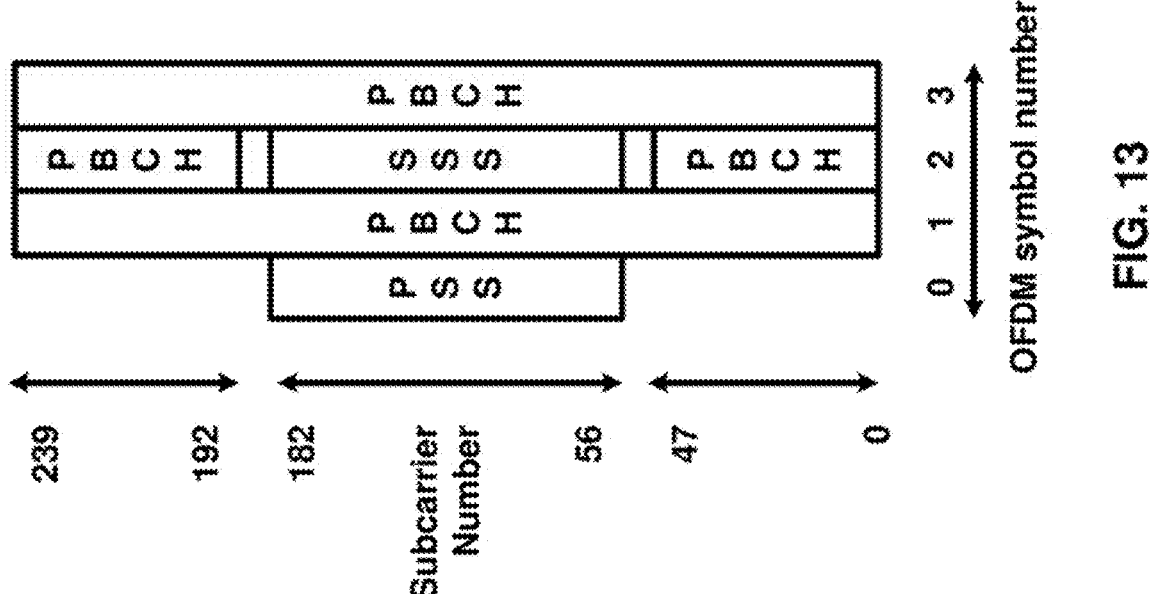
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
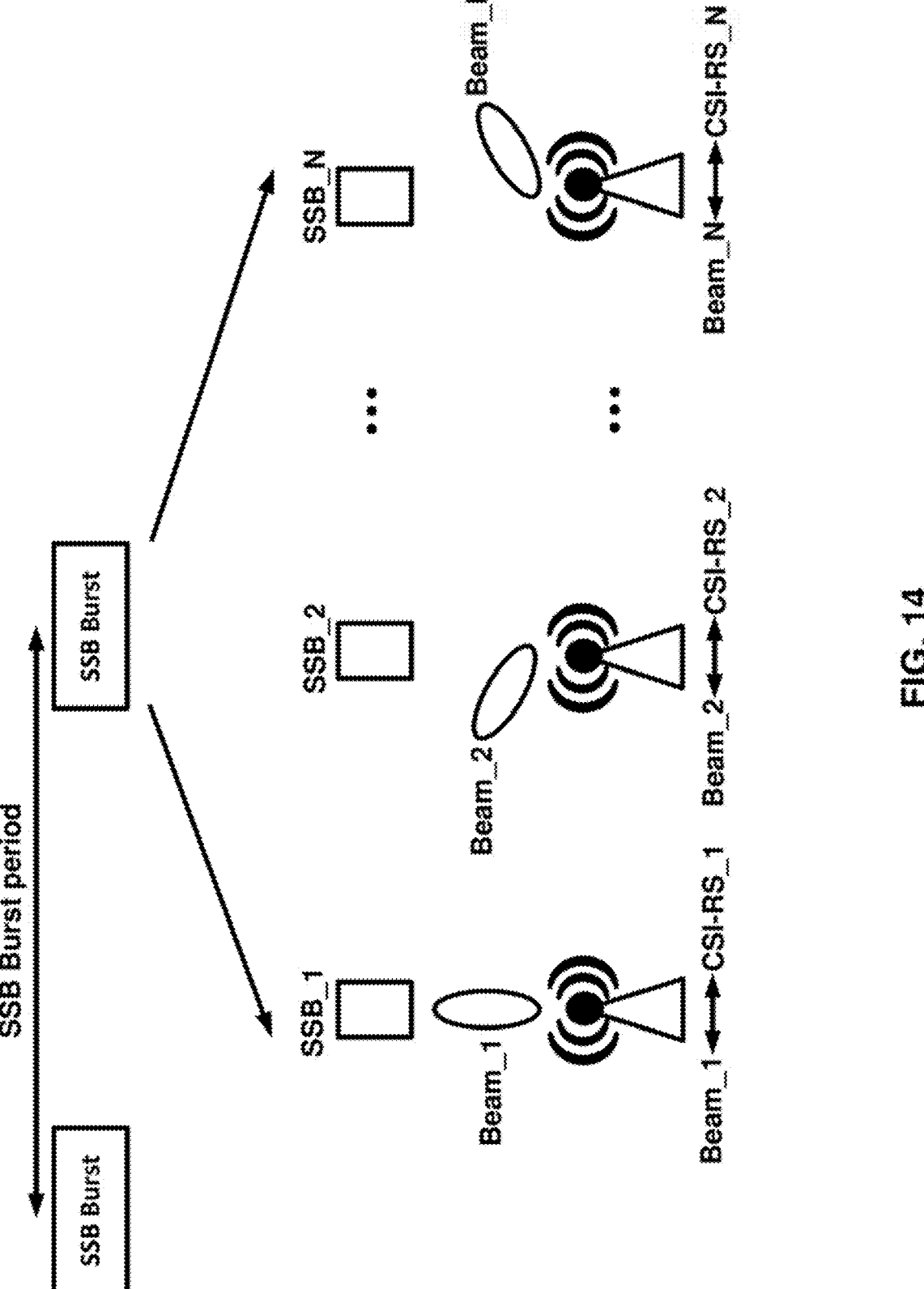
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
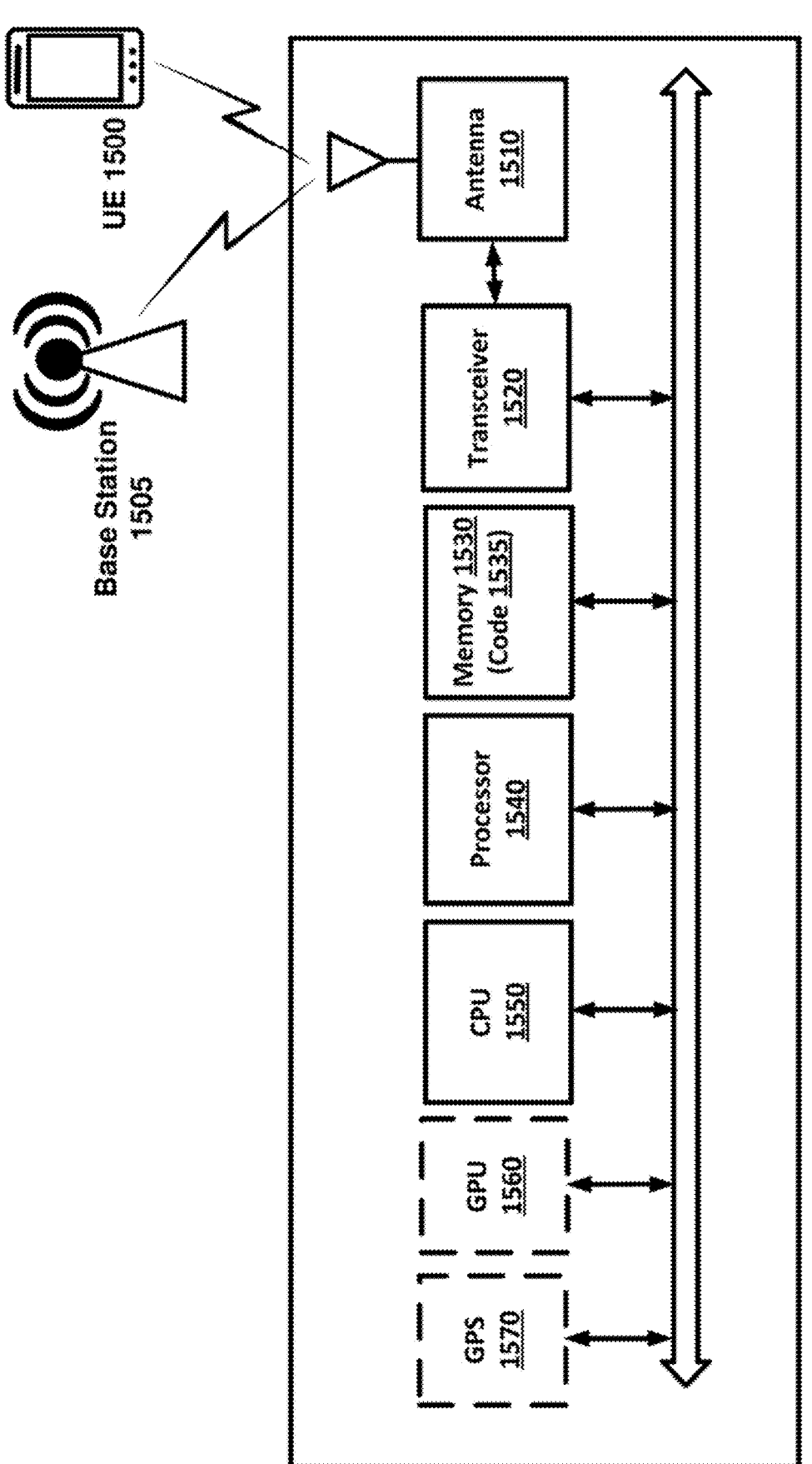
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

With reference to FIG. 15, the Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, a UE and/or a base station may perform a set of physical layer/medium access control procedures to acquire and maintain a set of beam pair links e.g., a beam used at transmit-receive point(s) (TRP(s)) for BS side paired with a beam used at UE. The beam pair links may be used for downlink and uplink transmission/reception. The beam management procedures may include one or more of: a beam sweeping process, a beam measurement process, a beam reporting process, a beam determination process, a beam maintenance process, and a beam recovery process. For example, beam sweeping process may be used for covering a spatial area, with beams transmitted and/or received during a time interval in a predetermined way. The beam measurement process may be used by the TRP(s) or UE to measure characteristics of received beamformed (BF) signals. The beam reporting process may be used by the UE to report information of BF signal(s) based on beam measurement. The beam determination process may be used by the TRP(s) or UE to select the Tx/Rx beam(s). The beam maintenance process may be used by the TRP(s) or UE to maintain the candidate beams by beam tracking or refinement to adapt to the channel changes due to UE movement or blockage. The beam recovery process may be used by the UE to identify new candidate beam(s) after detecting beam failure and subsequently indicate the TRP of beam recovery request with information of indicating the new candidate beam(s).

In some examples, beam management may be performed in UL and/or DL directions. When channel reciprocity can be characterized as good or otherwise exceeding a threshold value (e.g. in time division duplex (TDD) systems), beam management of one direction may be based on another direction, e.g. UL beam management may perform well based on the results of DL beam management. In some examples, beam correspondence may be used based on uplink-downlink reciprocity of beamformed channel, for example UL Tx/Rx beam(s) may be determined based on beam measurement of DL beamformed reference signals (RSs).

In some examples, group-based beam management may be used to manage beams in group basis instead of beam-by-beam basis, for example, considering that beams sharing similar channel properties may be put into the same beam group. The beam management procedure may include beam sweeping, beam measurement, beam reporting (e.g., grouping based beam reporting), beam determination, beam maintenance (e.g., group-based beam maintenance), beam failure recovery, and the like.

Figure 16:
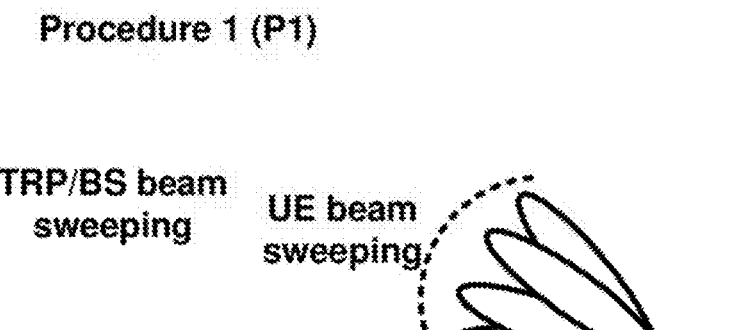
FIG. 16 shows example beam management processes according to some aspects of some of various exemplary embodiments of the present disclosure.
Figure 16:
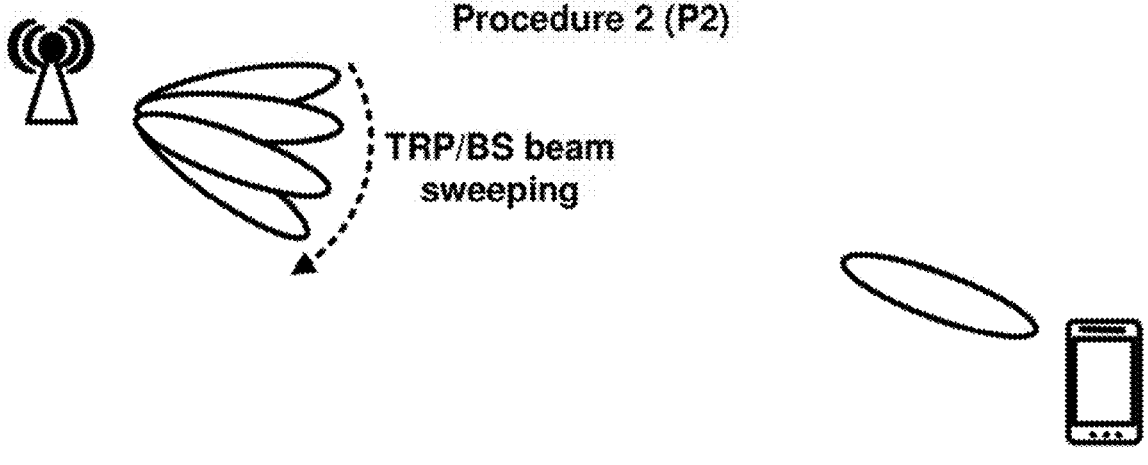
Figure 16:
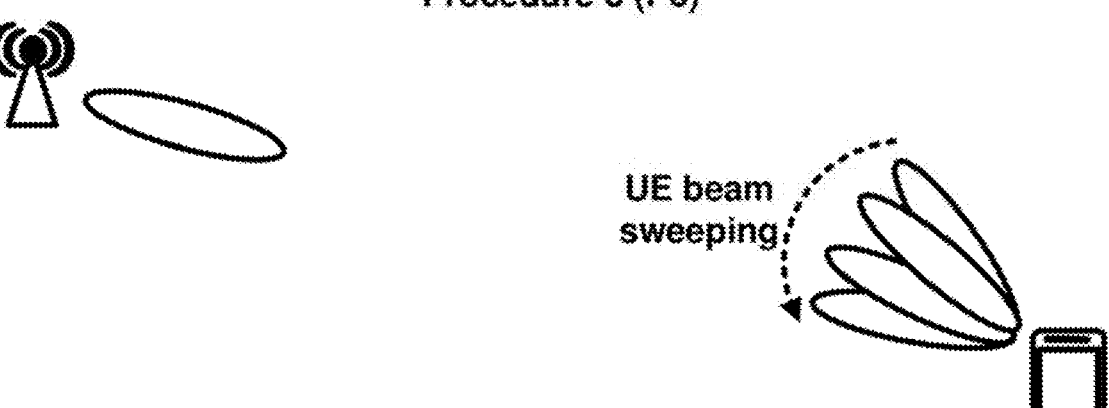

In some examples, as shown in FIG. 16, three procedures of beam management may be used with beam sweeping on TRP/BS and/or on the UE side: Procedure 1 (P1): TRP/BS beam sweeping and UE beam sweeping; Procedure 2 (P2): TRP/BS beam sweeping only; and Procedure 3 (P3): UE beam sweeping only. In some examples, to perform sweeping over multiple Tx beams, each Tx beam may be transmitted on an RS resource for beam management. In some examples, to perform sweeping over multiple Rx beams, a Tx beam may be transmitted repeatedly multiple times in the same RS resource set so that receive side may sweep its Rx beams in multiple transmission instants. For downlink beam management, the TRP/BS may have a set of N Tx beams and the UE may have a set of M Rx beams for beam sweeping in P1. Each of the N Tx beams may be transmitted M times from the TRP/BS side so that may be received using M multiple beams per Tx beam. For P2, N BF CSI-RS transmission instants may be required since the UE receives a set of N Tx beams with the same Rx beam. For P3, it may require M beamformed CSI-RS transmission instants with the same Tx beam for the UE to sweep M Rx beams. In some examples, for uplink beam management, the process may be the same except that the transmit side and receive side may be switched between TRP and UE.

In some examples, the UE and/or TRP/BS may perform beam measurement by measuring beam sweeping based RS, e.g., CSI-RS, for downlink and SRS for uplink. For downlink, a UE may measure the received power of a beamformed RS and may determine the beam quality based on the beam measurement. Based on the measurement, beam grouping may be performed by the UE. A UE may group downlink Tx beams into the same beam group, according to spatial channel properties (e.g., angle of arrival, spatial correlation, etc.) observed by the UE. In some examples, multiple TRP Tx beams may correspond to the same Rx beam at UE. In some examples, multiple Tx-Rx beam pairs may be considered as multiple-to-one beam grouping.

In some examples, a UE may report beam information including measurement quantities for N downlink Tx beams and information indicating these N beams, e.g., DL RS ID(s). The measurement quantities may be in the form of reference signal received power (RSRP). Depending on whether beam grouping is performed or not, the beam reporting format may be group-based reporting or non-group-based reporting.

In some examples, based on the group-based reporting, the N downlink Tx beams in a reporting instance may be received simultaneously by the UE by multiple receive panels. The subsequent DL transmission may be scheduled with up to N downlink Tx beams. In some examples, based on non-group-based reporting, a UE may report the N downlink beams with the N-best received power. The subsequent DL transmission may be performed with one Tx beam selected from the N beams. The TRP/BS may not know which beams may be simultaneously received by the UE.

In some examples, based on downlink Tx beams, measurement quantities and grouping information reported by UEs, the TRP may determine the beam(s) used for data transmission. In some examples, the TRP/BS may follow UE recommendation and may use the beam with the best reported RSRP for data transmission. In some examples, the TRP/BS change or refine the beam. The TRP may indicate the UE which beams to be used for data/control information transmission and the UE may use the corresponding proper receive beam for data reception.

In some examples, the TRP/BS may indicate the beamformed RS ID (e.g., indicating Tx beam ID(s)) which represents the beam. In some examples, the TRP/BS may indicate the spatial channel properties information to the UE to assist UE-side beamforming/reception. The beam indication may be conducted via multi-stage indication for QCL among RS ports, via joint higher layer signaling and physical layer signaling to reduce the overhead while maintaining the flexibility of beam indication. In some examples, up to a first number (e.g., 128) beams may be configured by Radio Resource Control (RRC) layer signaling. Out of the first number candidate beams, up to a second number (e.g., 8) candidate beams may be selected by MAC layer signaling. The physical layer signaling may be used to indicate the beam (out of the second number of beams) for data transmission.

In some examples, the beam maintenance process (including beam tracking and refinement) may be designed to handle beam misalignment caused by unexpected UE mobility and to support beam refinement from wide to narrow beams. The beam maintenance process may involve beam tracking or refinement per Tx/Rx beam(s) which may be supported by P2 and P3 respectively. Through probing neighboring beams, beam tracking may efficiently track and compensate the change of optimal transmission direction. In some examples, the beam refinement may be based on wide beam selected from P1.

In some examples, a UE may monitor the reference signals for beam failure detection and whether any beam failure triggering condition has been met. Once the beam failure event is declared and if one or more new candidate beam(s) are identified, the beam recovery procedure may be triggered. In some examples, a UE identifier and/or new candidate beam(s) may be indicated to TRP/BS as part of beam recovery request. The UE may monitor the corresponding control channel search space to receive TRP/BS response for beam failure recovery request, which may be transmitted by the new Tx beam(s) identified by the UE. In some examples, to a non-contention based random access may be used for carrying beam failure recovery request. In some examples, uplink control channel may be used for carrying beam failure recovery request for secondary cells in the case of carrier aggregation. The TRP/BS and UE may use the newly identified beam(s) for subsequent communication.

In some examples, the network may activate and deactivate the configured TCI states for PDSCH of a Serving Cell or a set of Serving Cells (e.g., as configured by the RRC) by sending the TCI States Activation/Deactivation for UE-specific PDSCH MAC CE. In some examples, the network may activate and deactivate the configured TCI states for a codepoint of the DCI Transmission configuration indication field for PDSCH of a Serving Cell by sending the Enhanced TCI States Activation/Deactivation for UE-specific PDSCH MAC CE. The configured TCI states for PDSCH may be initially deactivated upon configuration and after a handover.

In some examples, if the MAC entity receives a TCI States Activation/Deactivation for UE-specific PDSCH MAC CE on a Serving Cell, the MAC entity may indicate to lower layers the information regarding the TCI States Activation/Deactivation for UE-specific PDSCH MAC CE.

In some examples, if the MAC entity receives an Enhanced TCI States Activation/Deactivation for UE-specific PDSCH MAC CE on a Serving Cell, the MAC entity may indicate to lower layers the information regarding the Enhanced TCI States Activation/Deactivation for UE-specific PDSCH MAC CE.

In some examples, the network may indicate a TCI state for PDCCH reception for a CORESET of a Serving Cell or a set of Serving Cells (e.g., as configured by the RRC) by sending the TCI State Indication for UE-specific PDCCH MAC CE.

In some example, if the MAC entity receives a TCI State Indication for UE-specific PDCCH MAC CE on a Serving Cell, the MAC entity may indicate to lower layers the information regarding the TCI State Indication for UE-specific PDCCH MAC CE.

In some examples, DCI formats 1_1 or 1_2 may be used for the scheduling of PDSCH in one cell. The DCI format 1_1 may comprise a Transmission configuration indication (TCI) field. The Transmission configuration indication field may comprise 0 bit if higher layer parameter tci-PresentIn-DCI is not enabled; otherwise the Transmission configuration indication field may comprise 3 bits. The DCI format 11 may comprise a Transmission configuration indication field. The Transmission configuration indication field may comprise 0 bit if higher layer parameter tci-PresentForDCI-Format1-2 is not enabled; otherwise the Transmission configuration indication field may comprise 1 or 2 or 3 bits determined by higher layer parameter tci-PresentForDCI-Format1-2.

In some examples, the channel state information (CSI) reporting may be triggered by DCI format 0_1 or DCI format 0_2. The time and frequency resources that may be used by the UE to report CSI may be controlled by the gNB. The CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR. For CQI, PMI, CRI, SSBRI, LI, RI, L1-RSRP, L1-SINR, a UE may be configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOn-PUSCH-TriggerStateList). A trigger state in CSI-AperiodicTriggerStateList may contain a list of associated CSI-ReportConfigs indicating the Resource Set IDs for channel and optionally for interference. A trigger state in CSI-SemiPersistentOnPUSCH-TriggerStateList may contains one associated CSI-ReportConfig.

In some examples, due to RF exposure issues, a UE may not transmit with high power towards a nearby human body, e.g. the human brain. The UE may satisfy regulatory requirements on maximum permissible exposure (MPE) limits. The MPE limits may be translated to parameters that may be considered by UE in different procedures, for example, in power control procedures to calculated UE transmission power for uplink signals or channels. Example such parameters may include a P-MPR (maximum allowed UE output power reduction) parameter, or a maxUplinkDutyCycle capability. In an example, based on the MPE limits, a UE may be allowed to reduce the maximum output power due to higher order modulations and transmit bandwidth configurations. The maximum power reduction (MPR) may depend on the UE power class, the channel bandwidth, and the physical channel/signal. When suffering from the MPE issue, the transmit power may be significantly reduced and, hence, may result in large performance degradation or even link failure in uplink transmissions (e.g., radio link failure (RLF) and/or uplink beam failure).

The use of P-MPR and maxUplinkDutyCycle may impact the maximum uplink performance for the selected UL transmission path. Since MPE issue may be highly directional in FR2, the required P-MPR and maxUplinkDuty-Cycle values may be uplink beam specific and may be different among different candidate uplink beams across different UE panels. In some examples, certain beams, e.g., uplink beams that may be pointing towards human body, may have high required P-MPR/low duty cycle while some other beams, e.g., uplink beams with beam pattern that may not coincide human body, may have very low required P-MPR/high duty cycle. The MPE issue may be directional/beam specific and the required P-MPR and duty cycle would be uplink beam specific. In some examples, having multiple candidate beams across multiple panels may provide the opportunity to determine beam pair links that have low required P-MPR/low duty cycle. Example embodiments enable uplink beam management processes that may alleviate the issues raised by MPE limits (e.g., link/uplink beam failure).

In some examples, UL beam selection for UEs equipped with multiple panels may be enabled considering UL coverage loss mitigation due to MPE. In some example, uplink beam selection may be based on UL beam indication with the unified TCI framework for UL fast panel selection. In some examples, UL TCI may be used as a source for the spatial properties of all UL signals/channels such as SRS, PUCCH and PUSCH. Such an UL TCI may contain a reference signal or a pointer to a reference signal, an SSB, a CSI-RS or an SRS. In some examples, a reference to a BWP may be included. In some examples, a reference to a serving cell may be included.

In some examples, in case the UL TCI is a DL RS, the UE may use that RS as pathloss reference RS for UL power control. In some examples, if the UL TCI is an SRS, a separate DL RS may be provided. In some examples, an UL TCI may be used to alleviate the issues related to maximum permissible emission (MPE). In some cases, the UE may reduce its transmit power on some of its antennas. If the gNB is aware of this reduction, the gNB may schedule an UL transmission on another antenna, where the full transmit power may be used.

In some examples, when beam correspondence between DL and UL holds, the joint TCI may be used to indicate the common beam for both DL and UL. When beam correspondence is not utilized, the UL-TCI may be used to indicate the common beam for UL. In some examples, when the UE is equipped with multiple antenna panels, fast panel selection (e.g. mitigating the UL coverage loss due to MPE or/and change in channel conditions) may be accommodated via panel-specific UL TCI state. In some examples, the UL TCI state may be associated/linked with an index of a source RS resource or resource set associated with an antenna panel. In some examples, for MPE mitigation, an alternate UL TX beam may be used for examples, using a UE-initiated UL TX beam update/switch.

In some examples, the MPE issue may be alleviated using processes at the UE and/or at the base station. In some examples, the base station may receive UL beam reports. To maximize the UL coverage while maintaining DL performance, it may be beneficial for UE to report CRI/SSBRI (CSI-RS Resource Indicator/Synchronization Signal Block Resource Indicator) for preferred UL and DL beams.

In some examples, MPE reporting may be triggered by UL beam failure. Once MPE happens, the serving UL beam may fail and may not be able to report the preferred DL/UL beams as scheduled by gNB. In some examples, a beam failure reporting and/or recovery procedure may be used to indicate uplink beam failure due to the MPE issue. In some examples, the UE may autonomously select an uplink beam or switch to a new uplink in response to the MPE issue. The UE may indicate the selection of a new beam and/or the switching to the new uplink beam using physical layer (e.g., using uplink control information) or MAC layer (e.g., using a MA CE) signaling. In some examples, the UE may use a procedure to determine an uplink beam/link failure due to MPE issue. For example, the UE may determine an uplink beam/link failure in response to the calculated uplink power of an uplink channel or an uplink signal may be smaller than a threshold or a calculated backoff power for a calculated power of an uplink channel or an uplink signal (e.g., to satisfy the MPE limit) may be larger than a threshold. The UE may determine that the serving UL beam suffers from MPE, and another UL beam may be better than the serving UL beam.

In some examples, a UE may report CRI and/or SSBRI (CSI-RS resource indicator/Synchronization Signal Block resource indicator) where the CRI/SSBRI may refer to a preferred spatial relation reference signal (RS) for UL transmission. In some examples, the UE may report SRI (SRS resource indicator) (e.g., in addition to CRI/SSBRI). In some examples the reporting of the CRI and/or the SSBRI and/or the SRI may be jointly with reporting of beam measurement parameters associated with downlink beams. In some examples, the reporting of the CRI and/or the SSBRI and/or the SRI may be separate from the beam measurement parameters associated with the downlink beams. In some examples, the reporting of the CRI and/or the SSBRI and/or the SRI may include one or more parameters associated with MPE or MPR.

In some examples, the base station may indicate, for example using physical layer signaling such as an SRI field in a downlink control information, to indicate a plurality of SRS (Sounding reference signal) resources associated with a plurality of uplink beams. The UE may autonomously select an SRS resource, from the plurality of SRS resources indicated by the DCI, and may use the uplink beam associated with the uplink beam for an uplink channel (e.g., PUSCH, for example PUSCH for transmission of a transport block scheduled by the DCI) transmission or an uplink signal transmission.

In some examples, a UE may report beam specific PHR (Power Headroom Report). The beam-specific PHR may be used by the base station to determine beam-specific MPE impact transparently, for example, based on difference value between Pc,max (which may be calculated based on P-MPR) and the required transmission power.

In some examples, the DL and UL beam determination mode may be based on DL RS measurements and TX/RX beam correspondence at the UE. In some examples, the spatial source reference signals (RSs) for uplink signals and channels may be DL RSs. In some examples, the downlink RSs may be used to determine UL TX beam utilizing TX/RX beam correspondence at the UE. The determination of the UL TX beam based on TX/RX beam correspondence may enable avoiding SRS based beam search, selection and refinement schemes that may be resource hungry and that may introduce high system overhead.

Figure 17:
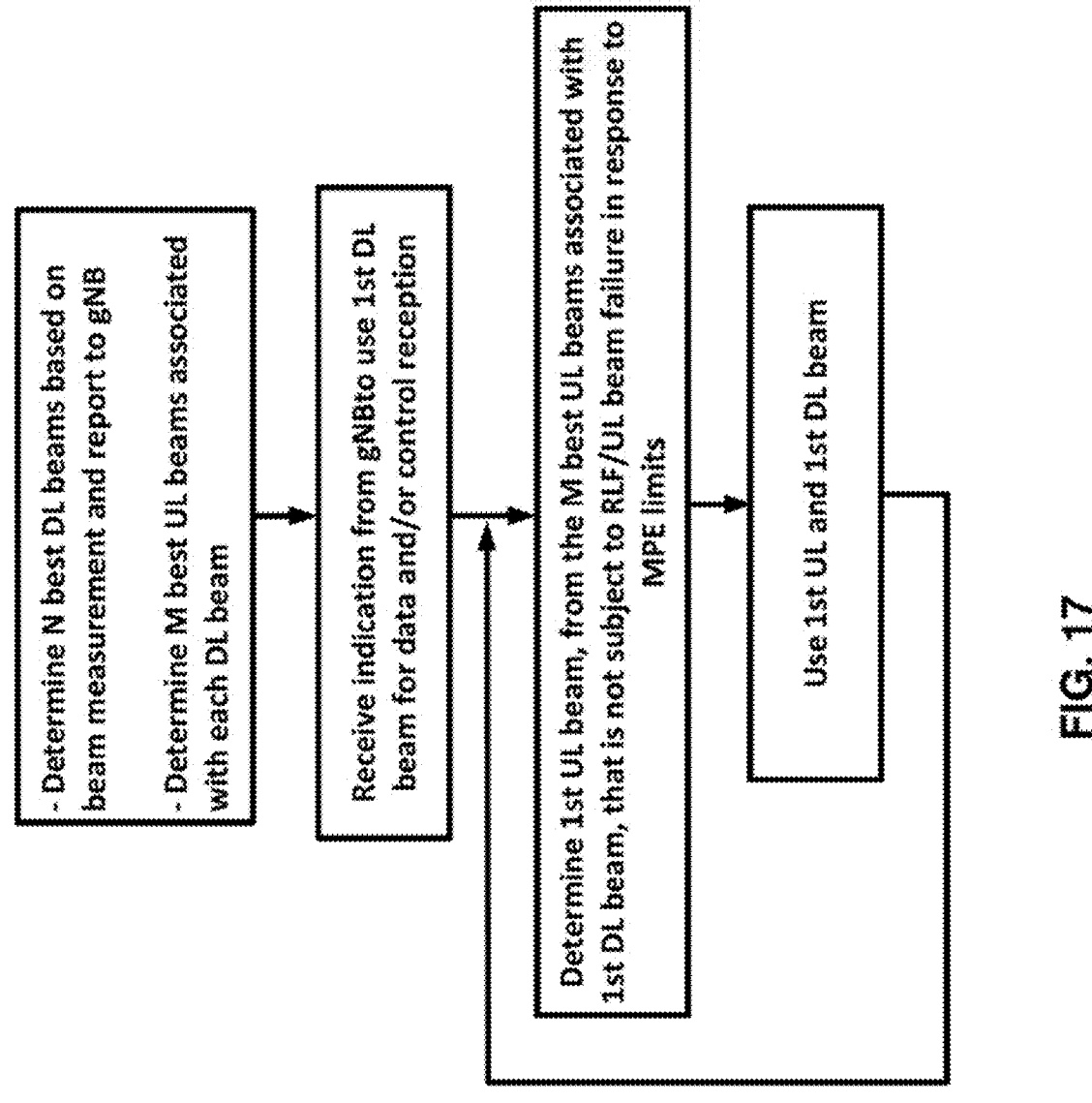
FIG. 17 shows an example process according to some aspects of some of various exemplary embodiments of the present disclosure.

In some examples, UL beam may be controlled by gNB. When a specific beam is affected by MPE, link maintenance without uplink beam failure may require a coordinated solution between the network and the UE. In some examples, a UE in severe MPE state may need a coordinated uplink TX beam switching to avoid RLF/UL beam failure. In some examples, such coordination may require measuring and averaging over a plurality of samples of configured candidate spatial sources (SSBs/CSI-RSs). For example, the network may configure a UE such that a first duration before the MPE event starts (e.g., that the UE limits the UL power due to MPE), the UE may report on spatial sources for the uplink TX determination that may be feasible from MPE point of view. When the base station has collected data on how to recover the link during the monitoring period, the base station may prepare the best link to address the MPE event and avoid losing the UL and/or avoid RLF/UL beam failure. In some examples, the UE may indicate the gNB on the upcoming presence of a blocking user before MPE actions are triggered to evaluate alternative uplink TX beams. The UE/gNB may initiate monitoring for alternative links before the actual MPE event is triggered. The gNB may determine the best link maintenance for UL and/or DL during the MPE event and avoid RLF/UL beam failure. In some examples, a UE may report CRI and/or SSBRI before MPE events, wherein the CRI and/or SSBRI may refer to a preferred spatial relation RS for UL transmission In an example embodiment as shown in FIG. 17, a UE may transmit uplink data or control information using an uplink beam (e.g., an uplink beam having the most gain toward the gNB). The UL beam may be selected based on UL-DL beam correspondence wherein the UL beam may be a corresponding to a DL beam (e.g., the DL beam indicated by the base station for receiving control or data). For example, the UE may report DL beam measurement parameters, based on a beam measurement or a beam sweeping process, to the base station and the base station may indicate the DL beam based on MAC layer or physical layer signaling. For example, the UE may receive a MAC CE comprising a TCI state identifier indicating the DL beam. For example, the UE may receive a MAC CE indicating a set of TCI states indicating a set of DL beams. The UE may receive a DCI indicating scheduling information for reception of transport block via a PDSCH. The DCI may comprise a TCI state identifier indicating the DL beam in the set of DL beams.

Figure 18:
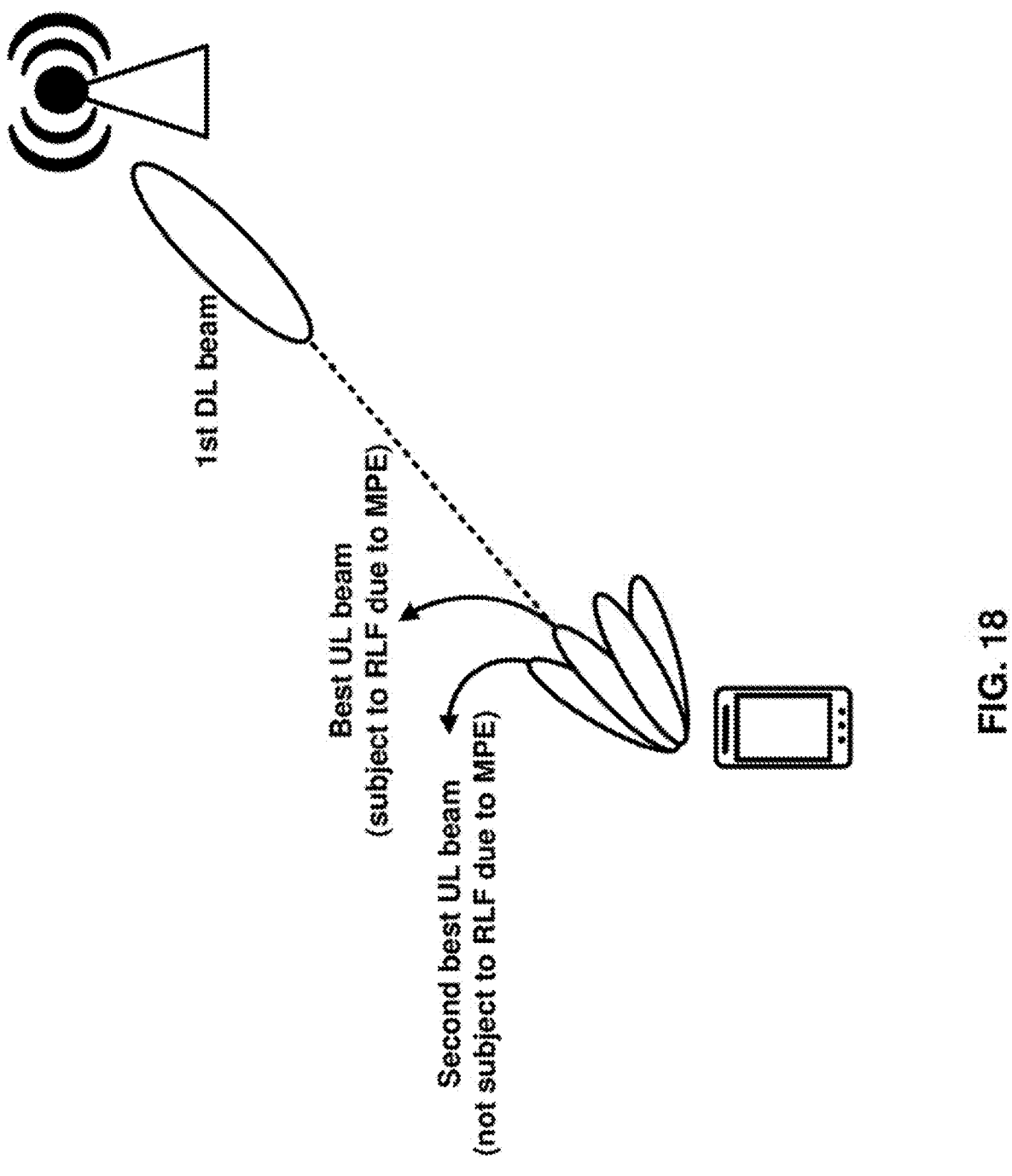
FIG. 18 shows an example process according to some aspects of some of various exemplary embodiments of the present disclosure.

While there are no MPE issues with the selected UL beam, the UE may use the selected uplink beam for control or data transmission. When MPE considerations require the UE transmit power to be reduced by the required P-MPR, UL performance may degrade and radio link failure and/or the uplink failure may occur. The UE may autonomously use a process to alleviate the uplink beam issue. For example as shown in FIG. 18, the UE may select a second UL beam using the codebook entry that best matches the second-best DL Precoding Matrix Indicator (PMI) found during the previous evaluation of DL beams (e.g., in the beam sweeping process). The PMI selection may be based on determining the highest beam gain among the possible DL beams, so that the ranking of DL beams corresponds to the gain of their corresponding UL beams. The UE may use the new selected UL beam as long as the selected UL beam does violate the MPE limit. The UE may select a third best beam, etc., until a suitable UL beam is determined. In some examples, the transmission parameters, e.g. reference signals, may remain unchanged so that the gNB may be unaware of the new UL beam selection. In some examples, the beam selection process may be repeated for every UL transmission until the MPE issue ends.

In some examples, a UE may indicate the UL beam switching (e.g., UL beam switching to alleviate the MPE issue) to the base station. For example, the UE may indicate the UL beam switching (e.g., UL beam switching to alleviate the MPE issue) based on MAC layer signaling (e.g., using a MAC CE). An example MAC CE may be a PHR. For example, a value of a field of the PHR (e.g., a flag) may indicate that an uplink beam switching due to the MPE issue. In some examples, the value of the field may indicate that the UE has selected the second-best UL beam in response to the MPE issue.

Figure 19:
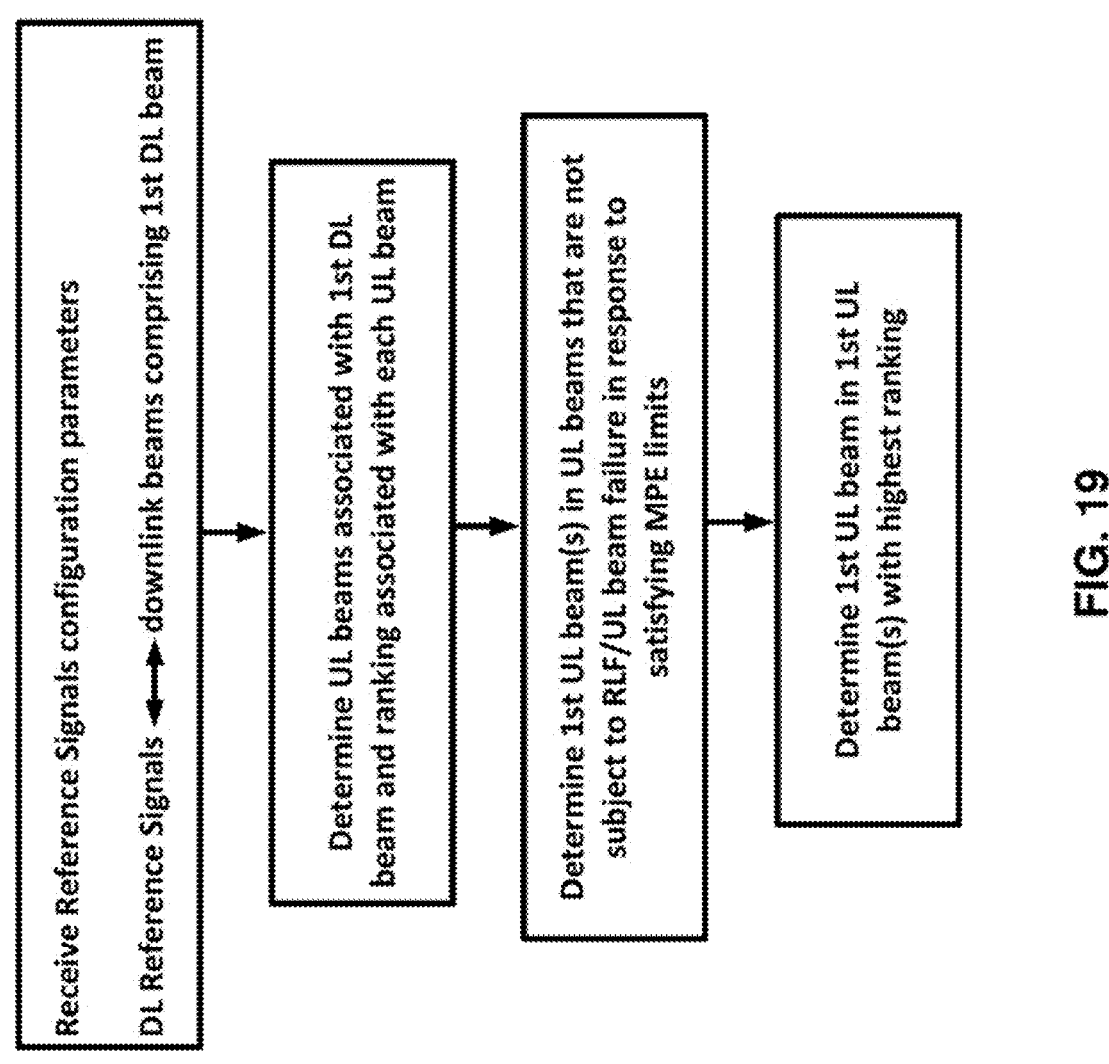
FIG. 19 shows an example process according to some aspects of some of various exemplary embodiments of the present disclosure.
Figure 21:
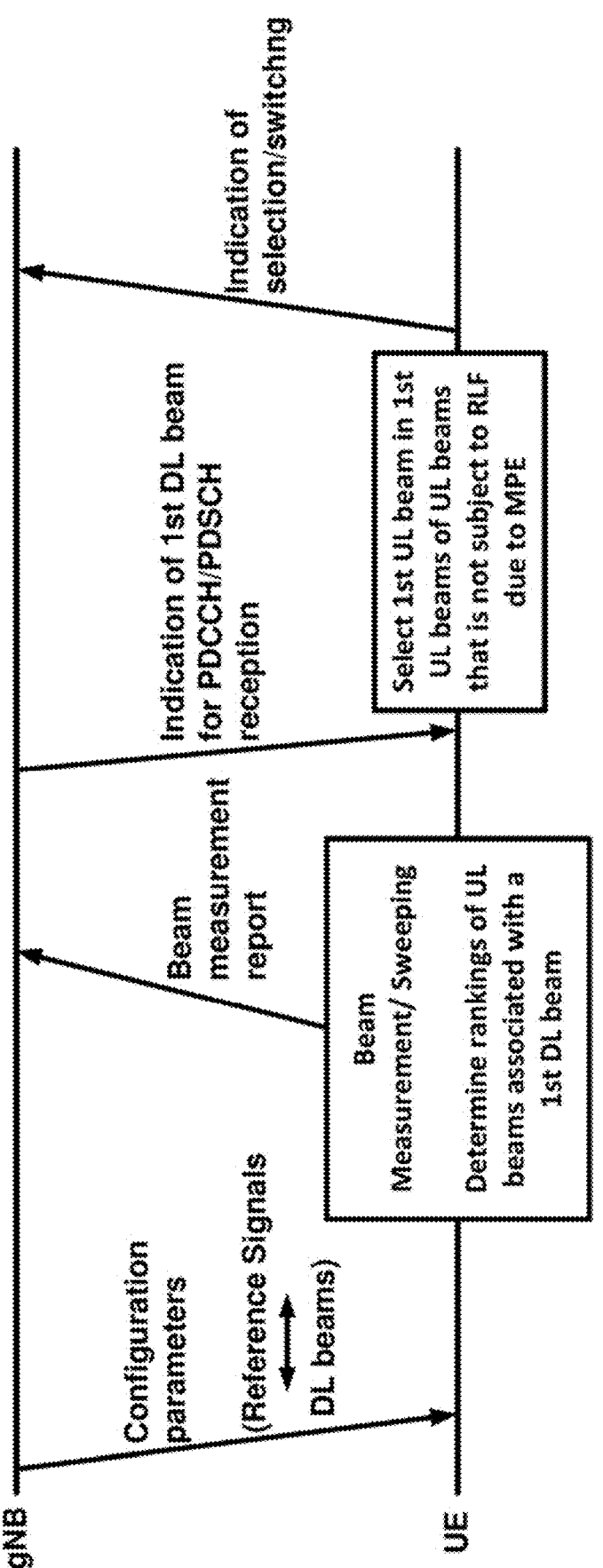
FIG. 21 shows an example process according to some aspects of some of various exemplary embodiments of the present disclosure.

In an example embodiment as shown in FIG. 19 and FIG. 21, a UE may receive one or more messages (e.g., one or more RRC messages) comprising configuration parameters. The one or more messages may comprise configuration parameters of one or more reference signals (e.g., CSI-RS, SSB, SRS, etc.). The UE may be configured with a plurality of downlink beams for reception of downlink data/control information. A reference signal may be beam-specific and may serve as a quasi-collation reference for downlink physical channels or signals received via a specific beam. The UE may be configured with a plurality of downlink beams and each downlink beam, of the plurality of downlink beams, may be associated with a corresponding downlink beam. The plurality of downlink beams may comprise a first downlink beam.

The UE may perform beam measurements, during a beam measurement/sweeping process, and may report the beam measurements to the base station. The beam measurement report may indicate a subset of the plurality of downlink beams as the best downlink beams, for example based on received power of the reference signals, corresponding to the plurality of downlink beams. For example, the received power levels (e.g., RSRPs) of reference signals associated with the subset of the plurality of downlink beams may be highest received power levels (e.g., N highest received power levels). The base station may take into account the received beam measurement report by the UE and may signal a selected downlink beam, in the plurality of downlink beams, for indicating the beam for a scheduled downlink transmissions (e.g., via a PDSCH) or indicating the beam for receiving downlink control information (e.g., via a PDCCH). For example, the UE may receive RRC configuration parameters for a plurality of downlink beams. The UE may receive, in response to transmitting the beam measurement report, a first MAC CE (e.g., a (Enhanced) TCI States Activation/Deactivation for UE-specific PDSCH MAC CE) indicating a subset of downlink beams from the plurality of downlink beams for PDSCH reception. The UE may receive, in a downlink scheduling DCI (e.g., a TCI field), a downlink beam from the subset of downlink beams (indicated by the first MAC CE) for reception of PDSCH. For example, the UE may receive a second MAC CE (e.g., a TCI State Indication for UE-specific PDCCH MAC CE) indicating a downlink beam for reception of PDCCH. The first MAC CE or the second MAC CE may indicate TCI state(s) for reception of PDSCH or PDCCH, wherein the TCI state(s) may indicate the downlink beam for reception of PDSCH or PDCCH.

The UE may determine, for example during a beam sweeping process, that a plurality of uplink beams is associated with a first downlink beam (the selected downlink beam indicated to UE by the base station using the physical layer/MAC layer signaling). The UE may determine a ranking for each uplink beam in the plurality of uplink beams. For example, the uplink beam with highest ranking in the plurality of uplink beams may be the best uplink beam for the first downlink beam. The UE may determine the rankings associated with the plurality of uplink beams using uplink-downlink beam correspondence. The plurality of uplink beams may correspond (based on the uplink-downlink beam correspondence) to a plurality of downlink beams and the UE may determine a ranking associated with an uplink beam in the plurality of uplink beams. The UE may determine the rankings based on comparing downlink precoding matrix indicators (PMIs), associated with the plurality of downlink beams, and a first PMI associated with the first downlink beam. For example, the uplink beam with the highest ranking may be an uplink beam for which the PMI associated with the downlink beam corresponding to the uplink is the best match with the PMI associated with the first downlink beam.

The UE may determine whether an uplink beam is subject to link failure (radio link failure or uplink beam failure) in response to maximum permissible exposure (MPE) limits. The UE may determine that the uplink beam is subject to link failure in response to the MPE limits and based on determining uplink power levels for one or more uplink channels and/or uplink signals and the determined uplink power levels being smaller than one or more thresholds or based on power backoff, for one or more uplink channels/signals, due to the MPE limits being larger than one or more thresholds. The MPE limits (e.g., parameters associated with the MPE limits such as P-MPR or maxUplinkDutyCycle) may be uplink beam specific. The MPE limits or the parameters associated with the MPE limits, such as P-MPR or maxUplinkDutyCycle, may be independently calculated for individual uplink beams. Accordingly, in some embodiments, the P-MPR or maxUplinkDutyCycle may be different for one or more uplink beams (or sets of uplink beams).

The UE may identify or determine first plurality of uplink beams of the plurality of uplink beams associated with the first downlink beam. Illustratively, the UE may identify or select the first plurality of uplink beams as uplink beams that are not be subject to the link failure (e.g., radio link failure or uplink beam failure). For example, the UE may determine uplink beams satisfying maximum permissible exposure (MPE) limits. The first plurality of uplink beams may be characterized as not be subject to the link failure (e.g., radio link failure or uplink beam failure) in response to reducing uplink power of uplink signals/channels (e.g., based on MPR requirements) to satisfy MPE limits.

The UE may identify or determine a first uplink beam, in the first plurality of uplink beams, that is associated with highest ranking. The UE may determine the first uplink beam, in the first plurality of uplink beams, that corresponds to a downlink beam associated with a PMI that is the best match with the first PMI, associated with the first downlink beam. The UE may transmit uplink data or control information (e.g., PUSCH or PUCCH) or uplink signals (e.g., SRS) using the first uplink beam or otherwise determined on a per uplink basis (e.g., independent determination).

The UE may continue monitoring control channels and receive downlink control channels using the first downlink beam (e.g., until the base station indicated a new downlink beam) in response to selecting/switching the first uplink beam. The UE may continue detecting the reference signals (e.g., CSI-RS) associated with the first downlink beam in response to selecting/switching the first uplink beam (e.g., until the UE determines switching to another uplink beam, for example due to MPE limits).

Figure 20:
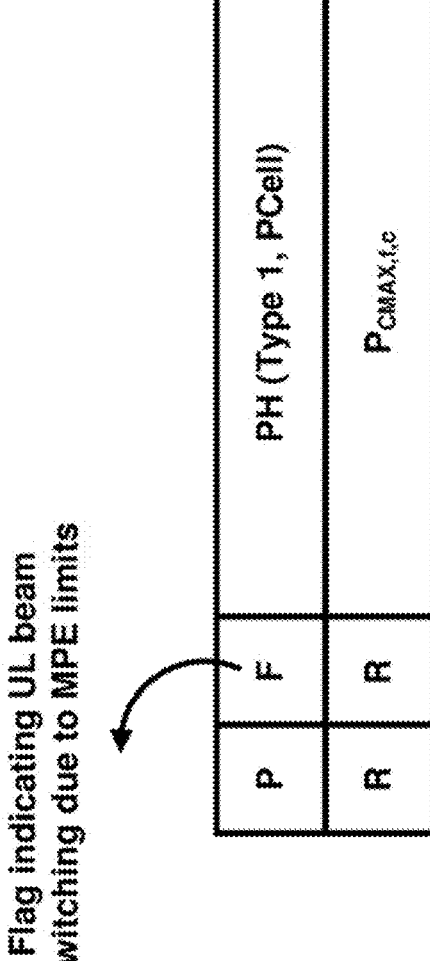
FIG. 20 shows an example process according to some aspects of some of various exemplary embodiments of the present disclosure.

In an example, in response to selecting/switching to the first uplink beam, the UE may indicate the selecting/switching to the base station. For example, the UE may indicate the selecting/switching the uplink beam in response to the MPE limits. In an example, the UE may use physical layer signaling (e.g., using uplink control information transmitted via an uplink control channel) or an uplink MAC CE to indicate the selecting/switching to the first uplink beam to the base station. In an example as shown in FIG. 20, the MAC CE may be a power headroom report (PHR) and a value of a field of the PHR may indicate the selecting/switching to the first uplink beam. For example, a first value of the field may indicate the selecting/switching to the uplink beam and a second value of the field may indicate no switching of the uplink beam (e.g., no switching of uplink beam due to the MPE limits).

In an embodiment, a user equipment (UE) may receive one or more messages comprising configuration parameters of reference signals associated with a plurality of downlink beams comprising a first downlink beam. The UE may determine based on a beam sweeping process comprising measurement of the reference signals: a plurality of uplink beams associated with the first downlink beam; and a corresponding ranking associated with each of the plurality of uplink beams. The UE may determine a first plurality of uplink beams, of the plurality of uplink links, that are not subject to link failure in response to satisfying maximum permissible exposure (MPE) limits. The UE may determine a first uplink beam, in the first plurality of uplink beams, that is associated with a highest ranking. The UE may transmit uplink data or control information using the first uplink beam.

In some embodiments, the reference signals comprise one or more of: channel state information reference signals (CSI-RSs); and synchronization signal blocks (SSBs).

In some embodiments, the UE may determine the plurality of uplink beams based on uplink-downlink beam correspondence. In some embodiments, the plurality of uplink beams may correspond to a first plurality of downlink beams based on the uplink-downlink beam correspondence; and the first plurality of downlink beams are associated with downlink precoding matrix indicators (PMIs) that have highest matching with a first downlink PMI associated with the first downlink beam. In some embodiments, the UE may determine the precoding matrix indicators (PMIs) based on a pre-determined codebook. In some embodiments, a ranking of an uplink beam, in the plurality of uplink beams, may be based on a matching between a precoding matrix indicator (PMI) associated with a downlink beam, corresponding to the uplink beam, and the first downlink PMI associated with the first downlink beam.

In some embodiments, a first maximum permissible exposure (MPE) limit associated with the first uplink beam may be independent of other MPE limits for other uplink beams in the plurality of uplink beams. In some embodiments, the maximum permissible exposure (MPE) limit of the first uplink beam may be associated with a first maximum allowed output power reduction (P-MPR) and a first maximum uplink duty cycle; and the other MPE limits for the other uplink beams may be associated with other P-MPRs and other maximum uplink duty cycles. In some embodiments, the UE may determine, based on the maximum allowed output power reductions (P-MPRs) or the maximum uplink duty cycles associated with the first plurality of uplink beams, that the first plurality of uplink beams are not subject to link failure in response to satisfying maximum permissible exposure (MPE) limits.

In some embodiments, the transmitting using the first uplink beam may be while using the first downlink beam for receiving a physical downlink control channel (PDCCH). In some embodiments, using the first downlink beam may comprise detecting one or more first reference signals associated with the first downlink beam.

In some embodiments, the UE may transmit to a base station an indication of switching to the first uplink beam by the UE. In some embodiments, the indication may be based on a medium access control (MAC) control element (MAC CE). In some embodiments, the transmitting the MAC CE indicating the switching to the first uplink beam may be via a physical uplink shared channel. In some embodiments, the medium access control (MAC) control element (MAC CE) may be a power headroom report (PHR). In some embodiments, the PHR may comprise a field with a first value, wherein: the first value may indicate switching to the first uplink beam by the UE; and a second value of the field may indicate no uplink beam switching.

In some embodiments, the UE may transmit measurement information associated with a first plurality of downlink beams, of the plurality of downlink beams, comprising the first downlink beam. In some embodiments, the measurement report may comprise identifiers of first reference signals, of the reference signals, associated with the first plurality of downlink beams. In some embodiments, the first reference signals, associated with the first plurality of downlink beams, may be received with highest power.

In some embodiments, the UE may receive a medium access control (MAC) control element (MAC CE) indicating a set of downlink beams, comprising the first downlink beam, for receiving downlink data. In some embodiments, the UE may receive a downlink control information comprising a transmission configuration indication (TCI) state field indicating the first downlink beam as a selected downlink beam, from the set of downlink beams, for receiving a scheduled physical downlink shared channel (PDSCH).

In some embodiments, the UE may receive a medium access control (MAC) control element (MAC CE) comprising a transmission configuration indication (TCI) state identifier indicating the first downlink beam, as a selected downlink beam, for receiving a physical downlink control channel (PDCCH).

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of uplink beam selection comprising:
receiving, by a user equipment (UE), one or more messages comprising configuration parameters of reference signals associated with a plurality of downlink beams comprising a first downlink beam;
identifying a plurality of uplink beams associated with the first downlink beam based on a measurement of the reference signals;
identifying a corresponding ranking associated with each of the plurality of uplink beams;
determining a first plurality of uplink beams, of the plurality of uplink beams, that satisfy maximum permissible exposure (MPE) limits and that are not subject to link failure;
determining, a first uplink beam, of the first plurality of uplink beams, that is associated with a highest corresponding ranking; and
transmitting, by the UE, uplink data or control information using the first uplink beam.

Clause 2. The method of Clause 1, wherein the reference signals comprise one or more of:
channel state information reference signals (CSI-RSs); and
synchronization signal blocks (SSBs).

Clause 3. The method of Clause 1, wherein identifying a plurality of uplink beams associated with the first downlink beam based on a measurement of the reference signals includes identifying the plurality of uplink beams based on uplink-downlink beam correspondence.

Clause 4. The method of Clause 3, wherein:
the plurality of uplink beams correspond to a first plurality of downlink beams based on the uplink-downlink beam correspondence; and
the first plurality of downlink beams are associated with downlink precoding matrix indicators (PMIs) that have highest matching with a first downlink PMI associated with the first downlink beam.

Clause 5. The method of Clause 4 further comprising determining the precoding matrix indicators (PMIs) based on a pre-determined codebook.

Clause 6. The method of Clause 4, wherein individual rankings of the uplink beams of the plurality of uplink beams are based on a matching between a precoding matrix indicator (PMI) associated with a downlink beam, corresponding to the uplink beam, and the first downlink PMI associated with the first downlink beam.

Clause 7. The method of Clause 1, wherein maximum permissible exposure (MPE) limits associated with individual uplink beams are individually independent.

Clause 8. The method of Clause 7, wherein the maximum permissible exposure (MPE) limit of an identified uplink beam is associated with a first maximum allowed output power reduction (P-MPR) and a first maximum uplink duty cycle.

Clause 9. The method of Clause 8 further comprising determining whether the first plurality of uplink beams are subject to link failure based on whether the first plurality of uplink beams satisfy maximum permissible exposure (MPE) limits.

Clause 10. The method of Clause 9, wherein determining whether the first plurality of uplink beams are subject to link failure is based on the maximum allowed output power reductions (P-MPRs).

Clause 11. The method of Clause 9, wherein determining whether the first plurality of uplink beams are subject to link failure is based on the maximum uplink duty cycles associated with the first plurality of uplink beam.

Clause 12. The method of Clause 1, wherein the first uplink beam is identified while using the first downlink beam for receiving a physical downlink control channel (PDCCH).

Clause 13 The method of Clause 12, wherein using the first downlink beam comprises detecting one or more first reference signals associated with the first downlink beam.

Clause 14. The method of Clause 1 further comprising transmitting, by the user equipment (UE), an indication of switching to the first uplink beam by the UE.

Clause 15. The method of Clause 14, wherein transmitting the indication includes transmitting the indication based on a medium access control (MAC) control element (CE).

Clause 16. The method of Clause 15, wherein transmitting the indication based on the medium access control (MAC) control element (CE) includes transmitting the indication via a physical uplink shared channel.

Clause 17. The method of Clause 15, wherein the medium access control (MAC) control element (CE) is a power headroom report (PHR).

Clause 18. The method of Clause 17, wherein the power headroom report (PHR) comprises a field with a first value indicating switching to the first uplink beam by the user equipment (UE) and a second value of the field indicating no uplink beam switching.

Clause 19. The method of Clause 1 further comprising transmitting measurement information associated with a first plurality of downlink beams, of the plurality of downlink beams, comprising the first downlink beam.

Clause 20. The method of Clause 18, wherein the measurement information comprises identifiers of first reference signals, of the reference signals, associated with the first plurality of downlink beams.

Clause 21. The method of Clause 19, wherein the first reference signals, associated with the first plurality of downlink beams, correspond to reference signals received with a highest power.

Clause 22. The method of Clause 1 further comprising receiving a medium access control (MAC) control element (CE) indicating a set of downlink beams, comprising the first downlink beam for receiving downlink data.

Clause 23. The method of Clause 22 further comprising receiving a downlink control information comprising a transmission configuration indication (TCI) state field indicating the first downlink beam as a selected downlink beam, from the set of downlink beams, for receiving a scheduled physical downlink shared channel (PDSCH).

Clause 24. The method of Clause 1 further comprising receiving a medium access control (MAC) control element (CE) comprising a transmission configuration indication (TCI) state identifier indicating the first downlink beam, as a selected downlink beam, for receiving a physical downlink control channel (PDCCH).

Clause 25. An apparatus for utilization in wireless communications comprising:

an antenna for use in transmission of electromagnetic signals;

a memory for maintaining computer-readable code; and a processor for executing the computer-readable code that causes the apparatus to receive one or more messages comprising configuration parameters of reference signals associated with a plurality of downlink beams comprising a first downlink beam;

identify a plurality of uplink beams associated with the first downlink beam based on a measurement of the reference signals and associate a corresponding ranking with each of the plurality of uplink beams;

determine a first plurality of uplink beams, of the plurality of uplink beams, that satisfy maximum permissible exposure (MPE) limits and that are not subject to link failure;

determine a first uplink beam of the first plurality of uplink beams that is associated with a highest corresponding ranking; and transmit uplink data or control information using the first uplink beam.

Clause 26. The apparatus of Clause 25, wherein the reference signals comprise one or more of:

channel state information reference signals (CSI-RSs); and synchronization signal blocks (SSBs).

Clause 27. The apparatus of Clause 25, wherein the apparatus identifies the plurality of uplink beams based on uplink-downlink beam correspondence.

Clause 28. The apparatus of Clause 27, wherein:

the plurality of uplink beams correspond to a first plurality of downlink beams based on the uplink-downlink beam correspondence; and the first plurality of downlink beams are associated with downlink precoding matrix indicators (PMIs) that have highest matching with a first downlink PMI associated with the first downlink beam.

Clause 29. The apparatus of Clause 28, wherein the apparatus is further configured to determine the precoding matrix indicators (PMIs) based on a pre-determined codebook.

Clause 30. The apparatus of Clause 28, wherein individual rankings of the uplink beams of the plurality of uplink beams are based on a matching between a precoding matrix indicator (PMI) associated with a downlink beam, corresponding to the uplink beam, and the first downlink PMI associated with the first downlink beam.

Clause 31. The apparatus of Clause 25, wherein maximum permissible exposure (MPE) limits associated with individual uplink beams are individually independent.

Clause 32. The apparatus of Clause 31, wherein the maximum permissible exposure (MPE) limit of an identified uplink beam is associated with a first maximum allowed output power reduction (P-MPR) and a first maximum uplink duty cycle.

Clause 33. The apparatus of Clause 31, wherein the apparatus is further configured to determine whether the first plurality of uplink beams are subject to link failure based on whether the first plurality of uplink beams satisfy maximum permissible exposure (MPE) limits.

Clause 34. The apparatus of Clause 33, wherein the apparatus determines whether the first plurality of uplink beams are subject to link failure based on the maximum allowed output power reductions (P-MPRs).

Clause 35. The apparatus of Clause 33, wherein the apparatus determines whether the first plurality of uplink beams are subject to link failure based on the maximum uplink duty cycles associated with the first plurality of uplink beam.

Clause 36. The apparatus of Clause 25, wherein the first uplink beam is identified while using the first downlink beam for receiving a physical downlink control channel (PDCCH).

Clause 37. The apparatus of Clause 25, wherein using the first downlink beam comprises detecting one or more first reference signals associated with the first downlink beam.

Clause 38. The apparatus of Clause 25 further comprising transmitting, by the user equipment (UE), an indication of switching to the first uplink beam by the UE.

Clause 39. The apparatus of Clause 38, wherein transmitting the indication includes transmitting the indication based on a medium access control (MAC) control element (CE).

Clause 40. The apparatus of Clause 39, wherein transmitting the indication based on the medium access control (MAC) control element (CE) includes transmitting the indication via a physical uplink shared channel.

Clause 41. The apparatus of Clause 40, wherein the medium access control (MAC) control element (CE) is a power headroom report (PHR).

Clause 42. The apparatus of Clause 41, wherein the power headroom report (PHR) comprises a field with a first value indicating switching to the first uplink beam by the user equipment (UE) and a second value of the field indicating no uplink beam switching.

Clause 43. The apparatus of Clause 25 further comprising transmitting measurement information associated with a first plurality of downlink beams, of the plurality of downlink beams, comprising the first downlink beam.

Clause 44. The apparatus of Clause 43, wherein the measurement information comprises identifiers of first reference signals, of the reference signals, associated with the first plurality of downlink beams.

Clause 45. The apparatus of Clause 44, wherein the first reference signals, associated with the first plurality of downlink beams, correspond to reference signals received with a highest power.

Clause 46. The apparatus of Clause 25 further comprising receiving a medium access control (MAC) control element (CE) indicating a set of downlink beams, comprising the first downlink beam, for receiving downlink data.

Clause 47. The apparatus of Clause 46 further comprising receiving a downlink control information comprising a transmission configuration indication (TCI) state field indicating the first downlink beam as a selected downlink beam, from the set of downlink beams, for receiving a scheduled physical downlink shared channel (PDSCH).

Clause 48. The apparatus of Clause 25 further comprising receiving a medium access control (MAC) control element (CE) comprising a transmission configuration indication (TCI) state identifier indicating the first downlink beam, as a selected downlink beam, for receiving a physical downlink control channel (PDCCH).

The invention claimed is:

1. A communication method for a user equipment (UE) configured to communicate with a base station, the communication method comprising:

receiving, by the UE from the base station, downlink reference signals associated with a plurality of downlink beams comprising a first downlink beam;

transmitting, by the UE to the base station, measurement information associated with at least the first downlink beam, wherein the measurement information comprises at least one identifier of the first downlink beam;

selecting, by the UE, an uplink beam associated with the first downlink beam based on a measurement of the downlink reference signals using a beam correspondence; and transmitting, by the UE to the base station, uplink data or control information using the uplink beam.

2. The communication method of claim 1, wherein the reference signals comprise at least one of:

channel state information reference signals (CSI-RSs) or synchronization signal blocks (SSBs).

3. The communication method of claim 1, wherein selecting the uplink beam comprises selecting a plurality of uplink beams associated with the first downlink beam based on the measurement of the reference signals, and the communication method further comprises:

identifying a corresponding ranking associated with each of the plurality of uplink beams.

4. The communication method of claim 3, wherein:

the plurality of uplink beams corresponds to a first plurality of downlink beams based on the beam correspondence; and the first plurality of downlink beams is associated with downlink precoding matrix indicators (PMIs) that have highest matching with a first downlink PMI associated with the first downlink beam.

5. The communication method of claim 4, further comprising:

determining the downlink PMIs based on a pre-determined codebook.

6. The communication method of claim 4, wherein individual rankings of the plurality of uplink beams are based on a matching between a PMI associated with a downlink beam, corresponding to the uplink beam, and the first downlink PMI associated with the first downlink beam.

7. The communication method of claim 3, wherein maximum permissible exposure (MPE) limits associated with individual uplink beams of the plurality of uplink beams are independent from each other.

8. The communication method of claim 7, wherein a MPE limit of an identified uplink beam is associated with a first maximum allowed output power reduction (P-MPR) and a first maximum uplink duty cycle.

9. The communication method of claim 8, further comprising:

determining whether the plurality of uplink beams is subject to link failure based on whether the plurality of uplink beams satisfy the MPE limits.

10. The communication method of claim 9, wherein determining whether the plurality of uplink beams is subject to link failure is based on the P-MPRs.

11. The communication method of claim 9, wherein determining whether the plurality of uplink beams is subject to link failure is based on maximum uplink duty cycles associated with the plurality of uplink beams.

12. The communication method of claim 3, further comprising:

determining a first plurality of uplink beams, of the plurality of uplink beams, that satisfy maximum permissible exposure (MPE) limits and that are not subject to link failure; and determining a first uplink beam, of the first plurality of uplink beams, that is associated with a highest corresponding ranking.

13. The communication method of claim 12, wherein the first uplink beam is identified while using the first downlink beam for receiving a physical downlink control channel (PDCCH).

14. The communication method of claim 13, wherein using the first downlink beam comprises detecting one or more first reference signals associated with the first downlink beam.

15. The communication method of claim 12, further comprising:

transmitting, to the base station, an indication of switching to the first uplink beam by the UE.

16. The communication method of claim 15, wherein transmitting the indication includes transmitting the indication based on a medium access control (MAC) control element (CE).

17. The communication method of claim 16, wherein transmitting the indication based on the MAC CE includes transmitting the indication via a physical uplink shared channel.

18. The communication method of claim 16, wherein the MAC CE is a power headroom report (PHR).

19. The communication method of claim 18, wherein the PHR comprises a field with a first value indicating switching to the first uplink beam by the UE or a second value of the field indicating no uplink beam switching.

20. The communication method of claim 1, wherein a reference signal associated with the first downlink beam is a reference signal received with a highest power.

21. The communication method of claim 1, further comprising:

receiving, from the base station, a MAC CE indicating a set of downlink beams, comprising the first downlink beam for receiving downlink data.

22. The communication method of claim 21, further comprising:

receiving, from the base station, downlink control information comprising a transmission configuration indication (TCI) state field indicating the first downlink beam as a selected downlink beam, from the set of downlink beams, for receiving a scheduled physical downlink shared channel (PDSCH).

23. The communication method of claim 1, further comprising:

receiving, from the base station, a MAC CE comprising a TCI state identifier indicating the first downlink beam, as a selected downlink beam, for receiving a physical downlink control channel (PDCCH).

24. The communication method of claim 1, further comprising:

receiving, from the base station, one or more messages comprising configuration parameters associated with the reference signals.

25. The communication method of claim 1, further comprising:

receiving, from the base station, a MAC CE indicating at least one of a TCI state or downlink control information comprising a field of the TCI state indicating a Quasi-Colocation (QCL) between the reference signals.

26. The communication method of claim 25, wherein the reference signals include at least one of SSB or CSI-RS.

27. The communication method of claim 1, wherein a QCL is maintained between the reference signals.

28. The communication method of claim 1, further comprising:

receiving, by the UE from the base station, transmission configuration information (TCI) state configuration information for configuring quasi co-location (QCL) relationship between one or more of the downlink reference signals and one or more demodulation reference signal (DM-RS) ports of one or more downlink channels.

29. A user equipment (UE) configured to communicate with a base station, the UE comprising:

reception circuitry configured to receive, from the base station, downlink reference signals associated with a plurality of downlink beams comprising a first downlink beam;

transmission circuitry configured to transmit, to the base station, measurement information associated with at least the first downlink beam, wherein the measurement information comprises at least one identifier of the first downlink beam; and selection circuitry configured to select an uplink beam associated with the first downlink beam based on a measurement of the downlink reference signals using a beam correspondence, wherein, the transmission circuitry is further configured to transmit uplink data or control information using the uplink beam.

30. The UE of claim 29, wherein the reception circuitry is further configured to receive, from the base station, transmission configuration information (TCI) state configuration information for configuring quasi co-location (QCL) relationship between one or more of the downlink reference signals and one or more demodulation reference signal (DM-RS) ports of one or more downlink channels.

31. A communication method for a base station configured to communicate with a user equipment (UE), the communication method comprising:

transmitting, by the base station to the UE, downlink reference signals associated with a plurality of downlink beams comprising a first downlink beam;

receiving, by the base station from the UE, measurement information associated with at least the first downlink beam, wherein the measurement information comprises at least one identifier of the first downlink beam; and receiving, by the base station from the UE, uplink data or control information transmitted by using an uplink beam, wherein the uplink beam is associated with the first downlink beam and is selected by the UE based on a measurement of the downlink reference signals using a beam correspondence.

32. The communication method of claim 31, further comprising:

transmitting, by the base station to the UE, transmission configuration information (TCI) state configuration information for configuring quasi co-location (QCL) relationship between one or more of the downlink reference signals and one or more demodulation reference signal (DM-RS) ports of one or more downlink channels.

33. A base station configured to communicate with a user equipment (UE), the base station comprising:

transmission circuitry configured to transmit, to the UE, downlink reference signals associated with a plurality of downlink beams comprising a first downlink beam; and reception circuitry configured to receive, from the UE, measurement information associated with at least the first downlink beam, wherein the measurement information comprises at least one identifier of the first downlink beam, wherein the reception circuitry is further configured to receive, from the UE, uplink data or control information transmitted by using an uplink beam, wherein the uplink beam is associated with the first downlink beam and is selected by the UE based on a measurement of the downlink reference signals using a beam correspondence.

34. The base station of claim 33, wherein the transmission circuitry is further configured to transmit, to the UE, transmission configuration information (TCI) state configuration information for configuring quasi co-location (QCL) relationship between one or more of the downlink reference signals and one or more demodulation reference signal (DM-RS) ports of one or more downlink channels.

* * * * *